US006421163B1

(12) United States Patent
Culver et al.

(10) Patent No.: US 6,421,163 B1
(45) Date of Patent: Jul. 16, 2002

(54) TWO DIMENSIONAL TRANSFORM GENERATOR

(75) Inventors: William H. Culver, Washington, DC (US); Donald Cronin Schmadel, Jr., College Park, MD (US)

(73) Assignee: Comptic, Inc., Washington, DC (US)

( * ) Notice: Subject to any disclaimer, the term of this patent is extended or adjusted under 35 U.S.C. 154(b) by 0 days.

(21) Appl. No.: 09/186,153

(22) Filed: Nov. 5, 1998

(51) Int. Cl.$^7$ .............................. G02B 1/01; G02F 1/07; G02F 1/00; G02F 1/03

(52) U.S. Cl. ...................... 359/279; 359/257; 359/237; 359/249

(58) Field of Search ................................. 359/558–562, 359/569, 279, 565, 237, 257, 258, 249, 19–23

(56) References Cited

U.S. PATENT DOCUMENTS

| | | | |
|---|---|---|---|
| 4,376,950 A | 3/1983 | Brown et al. .................. 348/40 |
| 4,566,031 A | 1/1986 | Kirk ............................ 473/538 |
| 4,813,761 A | 3/1989 | Davis et al. .................. 349/201 |
| 5,029,220 A | 7/1991 | Juday ............................ 382/6 |
| 5,036,512 A | * 7/1991 | Cloonan ..................... 359/122 |
| 5,040,140 A | 8/1991 | Horner ....................... 708/816 |
| 5,079,555 A | 1/1992 | Turpin ......................... 342/25 |
| 5,107,351 A | * 4/1992 | Leib ............................. 359/11 |
| 5,258,860 A | 11/1993 | Schehrer et al. .............. 359/6 |
| 5,276,636 A | * 1/1994 | Cohn ......................... 359/561 |
| 5,381,249 A | 1/1995 | Burney ....................... 342/179 |
| 5,384,573 A | 1/1995 | Turpin ....................... 210/188 |
| 5,416,618 A | 5/1995 | Juday .......................... 359/53 |
| 5,523,881 A | 6/1996 | Florence et al. ............ 359/561 |
| 5,548,418 A | 8/1996 | Gaynor et al. ................ 359/20 |
| 5,600,383 A | * 2/1997 | Hornbeck ................... 348/771 |
| 5,736,958 A | * 4/1998 | Turpin ........................ 342/179 |
| 5,751,243 A | 5/1998 | Turpin ........................ 342/179 |
| 5,767,993 A | 6/1998 | Burney ......................... 359/32 |
| 5,859,728 A | 1/1999 | Colin et al. ................. 359/561 |
| 6,055,086 A | 4/2000 | Soutar et al. ............... 359/246 |

OTHER PUBLICATIONS

Henry Stark, Academic Press, *Applications of Optical Fourier Transforms*, 1982, pp. 6–10.
Joseph W. Goodman, The McGraw Hill Co., Inc., *Introduction to Fourier Optics*, (revised) 1996, pp. 237–242.
Dorothy Garbose Crane, Library of Congress, *Crystal Lattices*, 1976, pp. 64–66.
Joseph L. Horner, Academic Press, *Optical Signal Processing*, 1987, pp. 31–35.
Louis C. Phillips et al., Proc. SPIE, Moving target SAR/SAR Imaging Using the ImSyn™ Processor, 1996, vol. 2751, pp. 1–11.
Terry M. Turpin, IEEE, Spectrum Analysis Using Optical Processing, 1981, vol. 69, No. 1, pp. 79–92.
William R. Franklin, Opt. Eng., *Optical Signal Processing at Essex Corporation*, 1996, vol. 35, No. 2, pp. 401–413.
A. Vander Lugt, IEEE, Signal Detection By Complex Spatial Filtering, 1963, pp. 139–145.

(List continued on next page.)

Primary Examiner—Georgia Epps
Assistant Examiner—Michael A. Lucas
(74) Attorney, Agent, or Firm—Staas & Halsey LLP

(57) ABSTRACT

A system that optically performs complex transforms, such as Fourier transforms. The system includes a pixel addressable spatial modulator that, in parallel, adjusts the phase of the light of each pixel. The modulator can be a reflective or transmissive type device. A transform lens, such as a Fourier lens, performs a two dimensional transform of the pixels outputs. This operation is repeated for the characteristic function (real and imaginary) of the function. The transformed outputs of the characteristic functions are sampled by a light detector and processed by a computer using simple fast operations, such as addition, into the final transform.

29 Claims, 20 Drawing Sheets

OTHER PUBLICATIONS

Haldun M. Ozaktas, Applied Optics, Digital Fourier Optics, 1996, Abstract.

Robert T. Weverka et al., Applied Optics, Photorefractive Processing for Large Adaptive Phased Arrays, 1996, Abstract.

Luis M. Bernardo et al., Applied Optics, Optical Fractional Fourier Transforms With Complex Orders, 1996, Abstract.

David Medlovic et al., Applied Optics, Optical Illustration of a Varied Fractional Fourier–Transform Order and the Radon–Wigner Display, 1996, Abstract.

Zeev Zalevsky et al., Applied Optics, Fractional Wiener Filter, 1996, Abstract.

Shlomo Greenberg et al., Applied Optics, Neural–Network Classifiers for Automatic Real–World Aerial Image Recognition, 1996, Abstract.

M. Barge et al., Applied Optics, 64–Channel Correlator Implementing a Kohonen–Like Neural Network for Handwritten–Digit Recognition, 1996, Abstract.

Sergio Granieri et al., Applied Optics, Space–Variant Optical Correlator Based on the Fractional Fourier Transform: Implementation by the Use of a Photorefractive $Bi_{12}GeO$ (BGO) Holographic Filter, 1996, Abstract.

Jian–Gho Zhang, Applied Optics, Strict Optical Orthogonal Codes for Purely Asynchronous Code–Division Multiple–Access Applications, 1996, Abstract.

Shutian Liu et al., Applied Optics, Image–Scaling Problem in the Optical Fractional Fourier Transform, 1997, Abstract.

John H. Reif et al., Applied Optics, Efficient Parallel Algorithms for Optical Computing With the Discrete Fourier Transform (DFT) Primitive, 1997, Abstract.

Marion O. Hagler, Applied Optics, Nyquist Stability Conditions for Laser Feedback Amplifiers With Gaussian or Lorentzian Gain Profiles, 1986, Abstract.

Henry Stark et al., Applied Optics, Design of Phase Gratings by Generalized Projections, 1991, Abstract.

Rick L. Morrison, Applied Optics, Symmetries That Simplify The Design of Spot Array Phase Gratings, 1992, Abstract.

YunJe Oh et al., Applied Optics, Soliton–Repulsion Logic Gate, 1996, Abstract.

X. D. Cao et al., Applied Optics, Experimental Cascaded Operation of Low–Birefringence Nonlinear–Optical Loop Mirrors, 1996, Abstract.

Mark A. Neifeld et al., Applied Optics, Parallel Data Detection In Page–Oriented Optical Memory, 1996, Abstract.

Joby Joseph et al., Applied Optics, Optical Fourier Processing Using Photoinduced Dichronism In A Bacteriohodopsin Film, 1996, Abstract.

* cited by examiner

TWO DIMENSIONAL TRANSFORM GENERATOR

BACKGROUND OF THE INVENTION

1. Field of the Invention

The present invention is directed to a system for performing a two dimensional transform, such as a two dimensional Fourier transform and, more particularly, to a system that performs the transformation in parallel.

2. Description of the Related Art

Many problems in computer science, particularly image processing problems, require the processing of vary large amounts of data. For example, the Fourier transform of a two dimensional image to allow the edges of objects in the image to be located is a computationally intensive operation generally performed on special array processing computers. The transform takes a considerable amount of time to perform and the computers are very expensive. What is needed is a system that performs a two dimensional transform by performing the operations in parallel to reduce the time required. What is also needed is a system that is low in cost.

SUMMARY OF THE INVENTION

It is an object of the present invention to provide a system that performs a two dimensional transform very quickly by performing steps of the transform in parallel.

It is an additional object of the present invention to provide a system that can be created at lower cost than array processors.

It is also an object of the present invention to provide an optical processing device to perform a two dimensional transform.

The above objects can be attained by a system that optically performs complex transforms such as Fourier transforms. The system includes a pixel addressable spatial modulator that adjusts the phase of the light of each pixel. A transform lens, such as a Fourier lens, performs a two dimensional transform of the pixels' outputs. The transformed outputs are sampled by a light detector and processed by a computer into the final transform.

The invention is an arrangement of optical and electronic devices, said arrangement capable of constructing and summing a finite series transformation of one function in terms of other functions.

These together with other objects and advantages which will be subsequently apparent, reside in the details of construction and operation as more fully hereinafter described and claimed, reference being had to the accompanying drawings forming a part hereof, wherein like numerals refer to like parts throughout.

In the basic configuration of the invention an amplitude beamsplitter divides an incoming beam into two usually equal portions. One portion enters the $k_0$ circuit, the other enters the $k_{m,n}$ circuit. The beam of the $k_{m,n}$ circuit passes to a spatial light phase modulator designated SLM, where it is further spatially divided into a multiplicity of pixel beams. The spatial light modulator, SLM, controls the relative phase of these pixel beams which are all simultaneously directed to form an interference pattern on a surface. Aside from the temporal oscillation at optical frequencies, the amplitude of the electric and magnetic field as a function of the x and y coordinates along this surface is a portion of the sought-after sum of the series eigenfunction expansion of a function F(x, y).

The invention provides that an optical detector array may collect the pattern for further analysis and adaptation for viewing. The invention further directs the beam of the $k_0$ circuit to said surface with such amplitude and phase as to add a bias field to the interference pattern. This bias field allows the use of square law detectors at said surface which otherwise cannot record the relative sign or phase of the field amplitudes within the pattern.

The invention provides methods by which all the portions may be produced separately on the surface and then added in a digital interface computer to produce F(x, y).

The invention is anticipated in particular for generating and summing Fourier eigenfunctions. However, adaptations within the invention provide the generation and summation of other functions as well.

DESCRIPTION OF THE PREFERRED EMBODIMENTS

Basic Hardware for One SLM Configuration

The invention comprises an arrangement of optical and electronic devices capable of constructing and summing a finite series transformation of one function in terms of other functions.

In the basic configuration of the invention an amplitude beamsplitter divides an incoming beam into two possibly equal portions.

One portion enters a first circuit as a bias beam, the other enters a second circuit. The beam of the second circuit passes to a spatial light phase modulator (SLM), where it is spatially divided into a multiplicity of pixel beams.

The spatial light modulator, SLM, controls the relative phase of these pixel beams which are all simultaneously directed by a lens to form an interference pattern on a surface. Aside from the temporal oscillation at optical frequencies, the amplitude of the electric and magnetic field as a function of the x and y coordinates along this surface is a portion of the sought-after sum of the series eigenfunction expansion of a function F(x, y). The invention uses an optical detector array to collect the pattern for further analysis and adaptation for viewing.

The invention further directs the beam of the first circuit to the surface with such amplitude and phase as to add a bias field to the interference pattern. This bias field allows the use of square law detectors at the surface which otherwise cannot record the relative sign or phase of the field amplitudes within the pattern.

The invention provides methods by which all the portions of the sought-after sum of the series eigenfunction expansion may be produced separately on the surface and then added in a digital interface computer to produce F(x, y).

The invention is preferably used for generating and summing Fourier eigenfunctions. However, adaptations within the invention provide the generation and summation of other functions as well.

Figure 1:
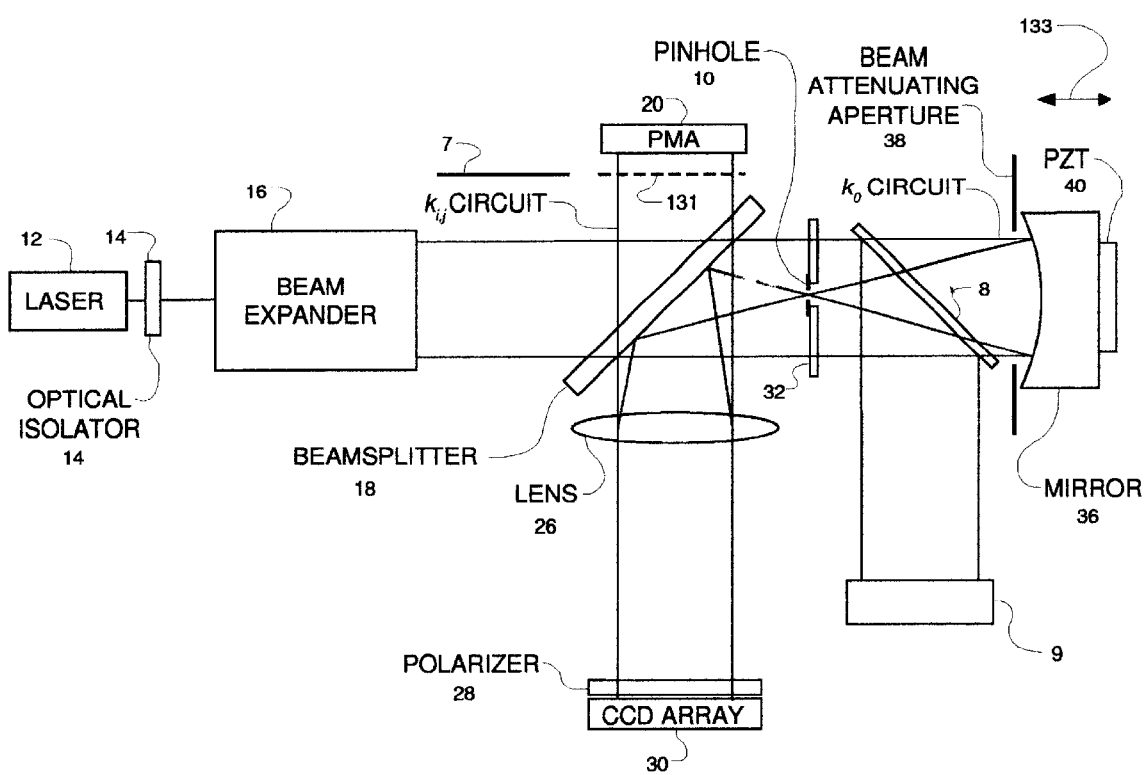
FIG. 1 illustrates an embodiment of the invention employing a reflective spatial light modulator (SLM).

In a first embodiment of the invention, shown in FIG. 1, in which a single reflective, spatial light modulator is used, a source 12 of electromagnetic radiation, which in the preferred embodiment is a conventional laser operating in the visible light range, is emitted through an optical isolator 14 and into a beam expander 16. The expanded beam is split by a conventional amplitude beamsplitter 18 which divides it into two beams. One of these beams enters the $k_{i,j}$ circuit as a transform path beam and the other enters the $k_0$ circuit as a bias beam. Note that any light sources having sufficient coherence can be used. Further, the use of visible light is only a convenience for alignment. Shorter wavelengths, on the other hand, offer more compact size.

Figure 2:
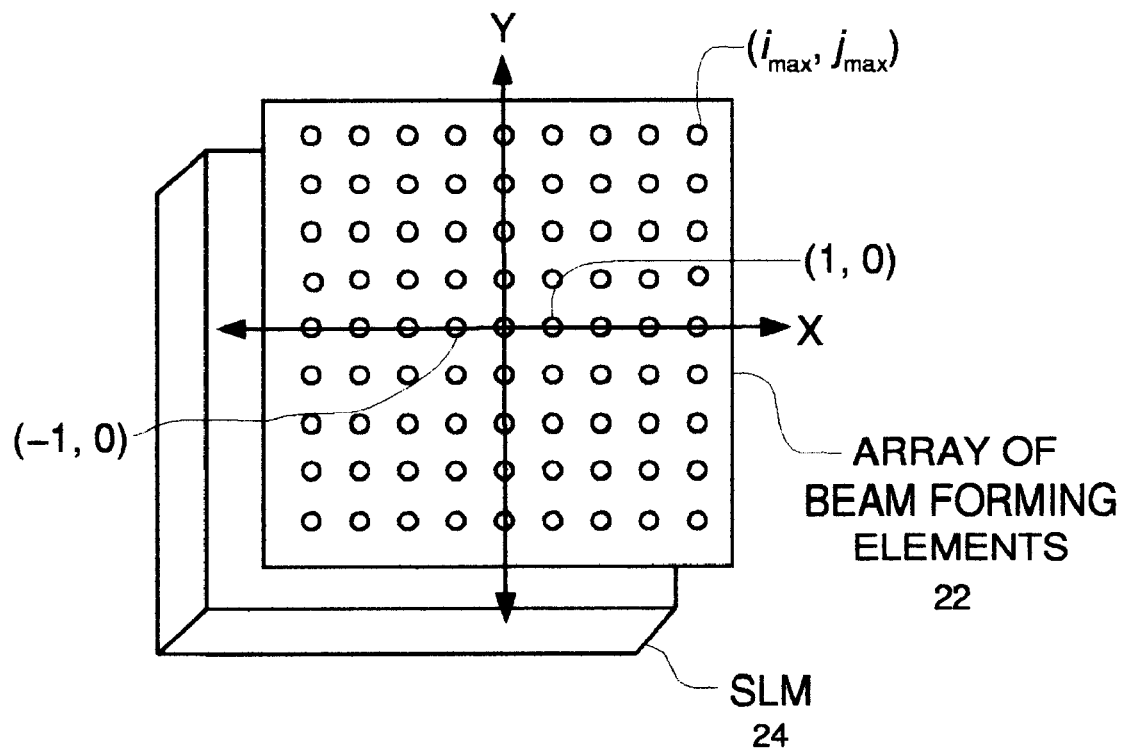
FIG. 2 is a representation of the pixel modulator assembly (PMA).

In the $k_{i,j}$ circuit the beam is incident upon a pixel modulator assembly (PMA) 20. The PMA 20, as depicted in FIG. 2, is an optional array 22 of pixel beam forming elements and a spatial light modulator (SLM) 24. The optional array 22 of beam forming elements spatially divides the beam from the beamsplitter 18 into a multiplicity of smaller pixel beams in such a way that each pixel beam emerges with a wavefront of the desired geometric angular dependency for phase and intensity. The array 22 of pixel beam forming elements may be an array of pinholes, microlenses, micro phase plates, etc. Each pixel beam is identified by the position of its point of origin in the two dimensional array, (i, j), and is further adjusted in phase as it reflects from a like indexed (i, j) region of the SLM 24. The SLM is a spatial light modulator, preferably capable of changing the relative phase of the light reflecting therefrom over a range of $2\pi$ (360°).

The SLM may be a digitally addressable liquid crystal array in which light is inherently divided into pixels by an array of individually addressable elements of the SLM. A suitable SLM is a model #VPJ-2000 which can be obtained from Epson of Torrance, Calif. A typical SLM will be an array of 488×488 pixels. The larger the number of pixels the larger the number of input signals that can be transformed in parallel. Each SLM pixel, as noted above, is independently addressable and adds a controlled variable phase delay to its corresponding emerging pixel beam. The amount of phase delay depends essentially on the magnitude of the signal used to drive the pixel element when it is addressed.

Figure 3:
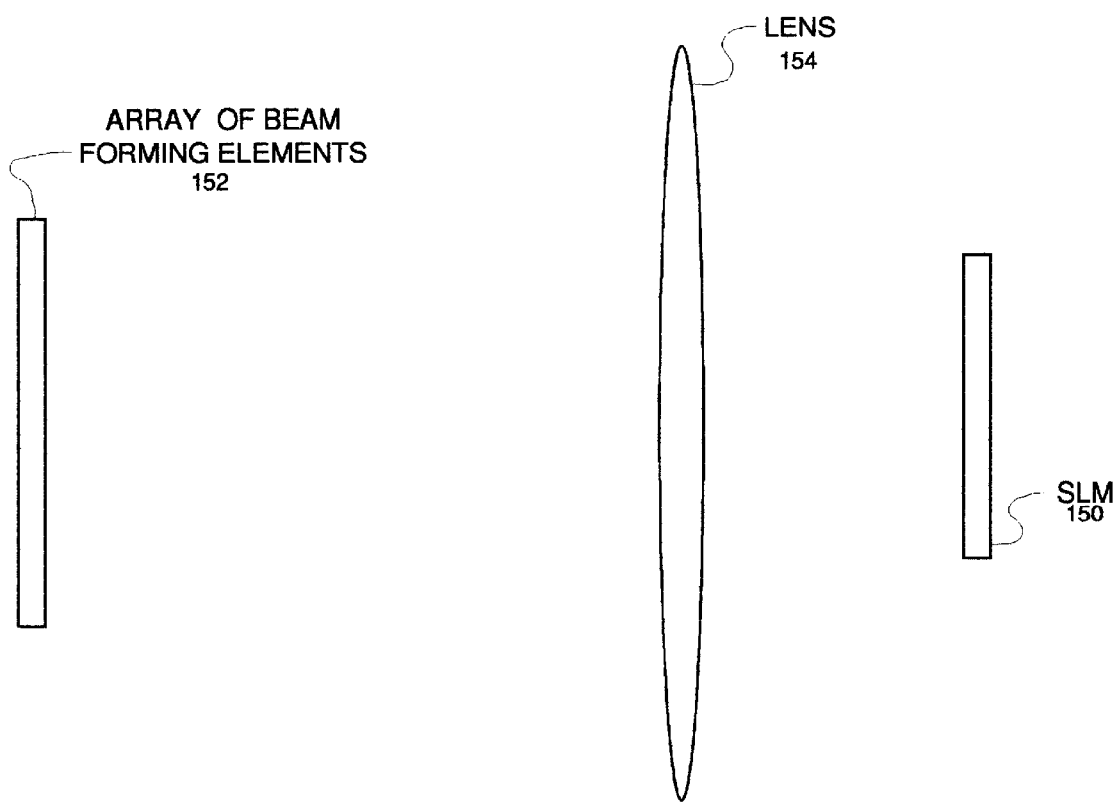
FIG. 3 is a representation of an alternative PMA using a lens to accommodate SLM's of different sizes.

FIG. 3 illustrates an alternative configuration for the PMA's discussed herein in which SLM 150 and pixel beam forming array 152 are located at conjugate planes of a convex lens 154. This configuration allows space between the components for additional hardware and allows for some relative magnification to match elements of different size. Note that when using a transmissive SLM, as described below, the pixel beam forming array 152 may be located in front of or behind the SLM 150 depending on the actual physical dimensions and construction of the components.

Each pixel beam $k_{i,j}$ phase adjusted by the SLM 24 of the PMA 20 (see FIG. 1), passes back through the beamsplitter 18, now acting as a beam combiner, to and through a Fourier transform lens 26, such as model #FX15/5F which can be obtained from Space Optics Research Labs of Chelmsford, Mass. Once the pixel beams pass through the lens 26 and an optional polarizer 28 used to reduced the amount of unwanted, randomly scattered light, they impinge on a detector array 30 where each pixel beam interferes with other pixel beams. A suitable detector array is a CCD array model #KAF-13000L and can be obtained from Kodak of Rochester, N.Y.

The light in the $k_0$ beam circuit passes through an optional spatial filter 32, which includes a pinhole 10. The light then passes through an optional beam attenuating aperture 38 to a conventional mirror 36 preferably concave and located so as to produce a focus of the $k_0$ beam. In the preferred embodiment, the location of this focus is the reflected focal point of the lens 26 and is centered at the pinhole 10 along the optical axis of the collimated $k_0$ beam. As such, the lens 26 will recollimate the $k_0$ beam which eventually arrives at the detector array 30 near to the normal.

The invention provides an optional and conventional piezoelectric transducer element (PZT) 40, to move the concave mirror along the beam optical axis. This element allows control over the phase of the $k_0$ beam relative to the $k_{i,j}$ beams.

A further optional beamsplitter 8 and precision detector 9 can be used to reduce shot noise.

The beamsplitter (and beam combiner) 18 may be a planar element, as shown in FIG. 1, or a cube beamsplitter. Various portions of the system may be combined as single solid components to improve rigidity.

The spatial filter 32 located within the $k_0$ beam is an optional element. This filter 32, which as previously noted may include a simple pinhole, provides sufficient divergence of the emerging beam so as to ensure uniform amplitude and phase across the collimated $k_0$ beam at the detector array 30.

The pinhole may be mounted on a transparent glass flat, as shown, which will permit most of the incoming radiation to pass to the concave mirror 36. The spatial filter 32 ensures that any wavefront distortion caused by the attenuator 38 or the concave mirror is minimized.

The beam attenuating aperture 38 is useful to adjust the amplitude of the $k_0$ beam relative to the beam directed into the $k_{i,j}$ circuit. A suitable attenuator 38 could be a simple aperture. Another possible attenuator is a liquid crystal amplitude modulator. Note however that some attenuators also change the phase of the light. The invention provides that the system may be recalibrated as described below to compensate for any undesired phase changes of the $k_0$ beam.

The optical isolator 14 is also optional and serves to reduce the amount of light scattered back into the laser. This back scattered light can cause instabilities in the laser resulting in excess noise. An isolator could be simple attenuator.

Figure 4:
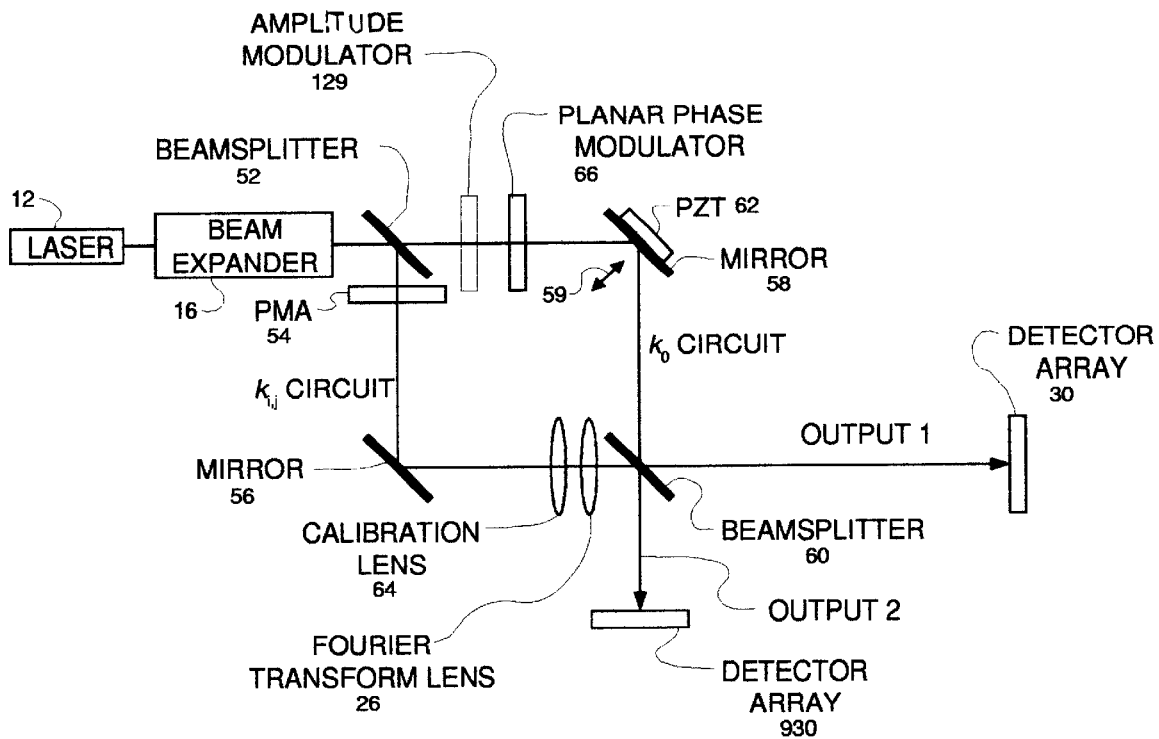
FIG. 4 depicts another embodiment of the invention employing a transmissive spatial light modulator.

The invention can also be implemented, in a second embodiment shown in FIG. 4, which uses a transmissive spatial light modulator (SLM) in the PMA. The incident source light is divided into beams by a first amplitude beamsplitter 52. Again one beam enters the $k_{i,j}$ circuit and the other enters the $k_0$ circuit. The beam of the $k_{i,j}$ circuit passes through a transmissive SLM in PMA 54 which divides it multiplicity of pixel beams each of which is independently adjusted in phase. These pixel beams are directed by a flat mirror 56 to the Fourier transform lens 26 and form an interference pattern on the surface of detector 30. The $k_0$ circuit beam, or bias beam, passes to a flat mirror 58 which directs it to a second beamsplitter 60, acting as a beam combiner, and eventually also onto the detector array 30. As previously described, the PZT element 62 is optionally provided to adjust the phase of the $k_0$ beam. Alternatively, a planar phase modulator 66 can provide this function. A calibration lens 64 can also be provided to calibrate the system as will be discussed later herein. This configuration also allows for an additional detector array which is useful for extending the dynamic range of the system as will be discussed below.

Figure 5:
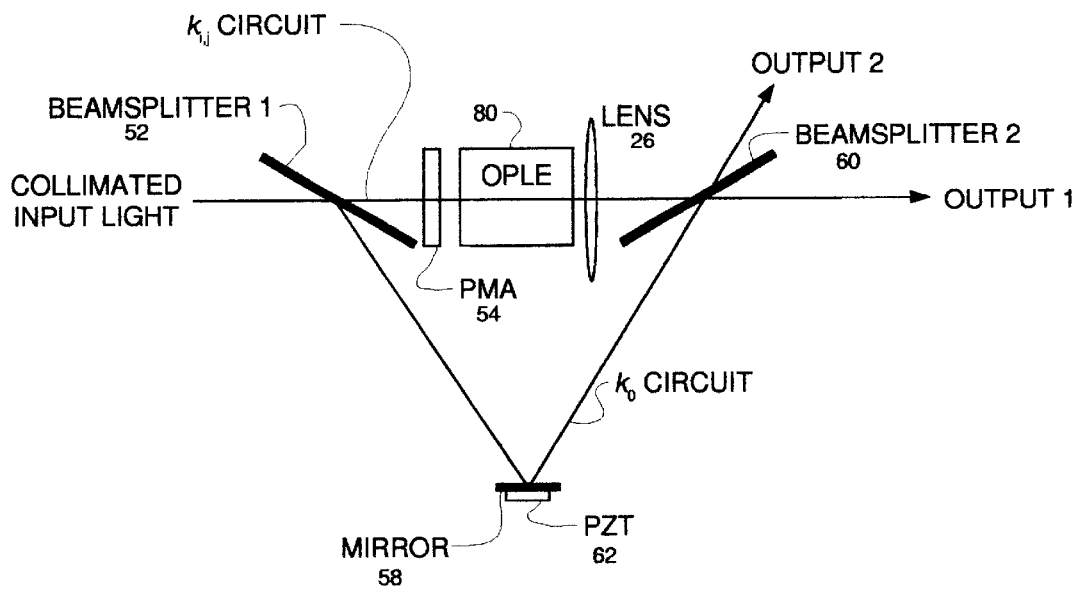
FIG. 5 is a further embodiment of the invention employing a transmissive spatial light modulator with one mirror.

The configuration of FIG. 4 can be somewhat simplified in a third embodiment as depicted in FIG. 5. This embodiment uses only one mirror 58 to redirect the $k_0$ beam to beamsplitter 60. This embodiment also contains an optional optical pathlength equalizer (OPLE) 80. The OPLE is a length of optically transparent material such as a block of glass having a higher index of refraction than the index encountered in the $k_0$ path. To understand the function of the OPLE, consider that the invention is useful for light sources with sufficient optical coherence to cause interference of the pixel beams over the field of view. This aspect will be explained further below. However, in FIG. 5 the difference in the geometric lengths of the $k_0$ and $k_{i,j}$ paths increases the required coherence length by this difference. The embodiment provides the OPLE 80 to reduce or eliminate this difference thus reducing the coherence requirement.

Method I

A first method of operation of the implementations described above will be explained using a specific example of a two dimensional transform generator in which pairs of pixel beams form interference patterns which are Fourier eigenfunctions of either the real or the imaginary part of some desired function, $F(\vec{r})$. In all that follows the positive branch is to be taken for all square roots.

Figure 6:
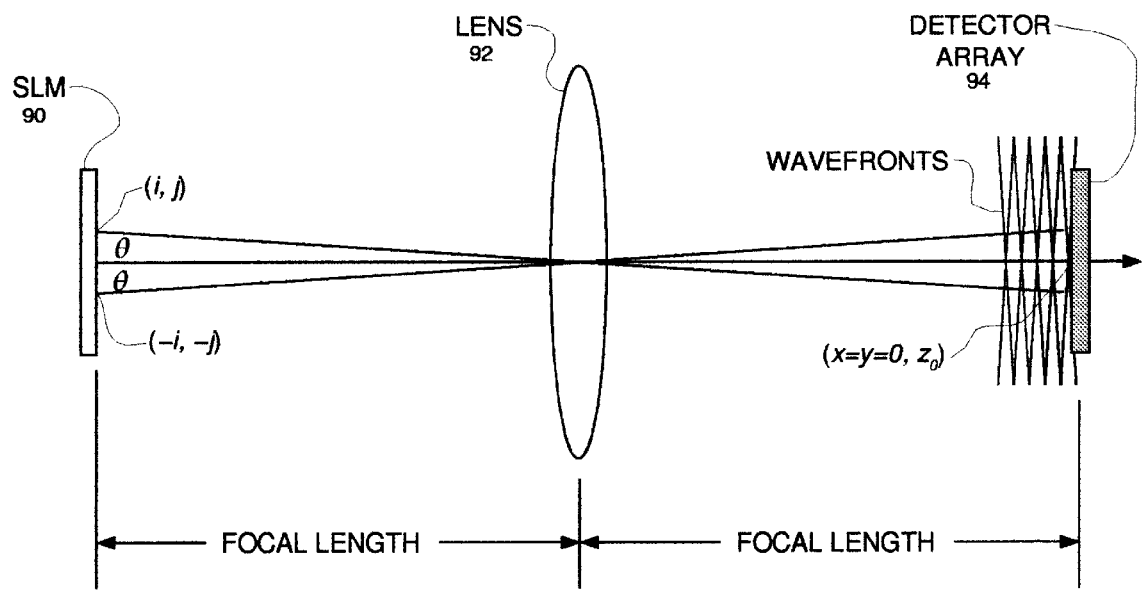
FIG. 6 is an illustration of the interference of two beams of light having the same wavelength.

Consider FIG. 6 where an SLM 90 is located at one focal plane of a Fourier lens 92, and a detector array 94 is located at the other focal plane. As is described in *Optical Signal Processing* edited by Joseph L Horner, 1987 (incorporated by reference herein), the interference pattern produced at the detector array 94 is the two dimensional Fourier transform of the pattern at the opposite focal plane or the SLM 90. For pixel beams this interference consists of both a Fraunhofer pattern and a Fresnel pattern. It is the Fraunhofer pattern which is of interest in this example. For the Fraunhofer pattern to dominate over the Fresnel diffraction features it is necessary that each pixel beam cover the detector array with a beam of near constant intensity and phase. For low f number configurations the optional array of beam forming elements 22 shown in FIG. 2 can provide this sufficient beam divergence prior to collimation by the Fourier lens.

Figure 7:
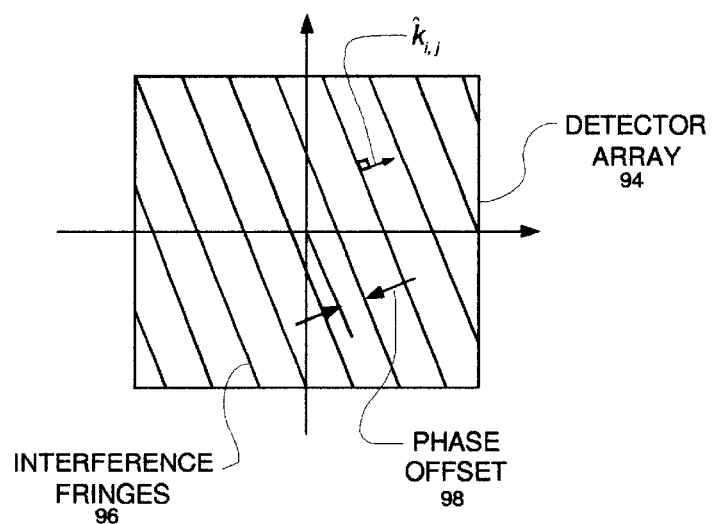
FIG. 7 is an illustration of the interference pattern on a surface by two interfering beams of light as in FIG. 6.

The Fraunhofer pattern produced on the detector array 94 can be characterized as a collection of overlaid patterns each the separate result of the interference of a pair of pixels of the SLM 90. Consider the light beams from pixels (i, j) and (−i, −j) whose paths are shown in FIG. 6. Recall that since the SLM 90 is located at the focal plane of the lens 92, the beams each exit the output side of the lens 92 as plane waves (albeit of finite extent). These resulting plane wave beams produce a periodic interference pattern including interference fringes 96 on the detector array 94 as shown in FIG. 7.

The radial spatial frequency vector, $\vec{k}_{i,j}$, of the amplitude of this periodic pattern lies in the same plane as the vector joining pixels (i, j) and (−i, −j), and also lies approximately in the plane of the detector array 94, aligned near normal to z the axis. The electric (or magnetic) field on the surface of the detector array 94 can be represented by:

$$E = E_0 \cos\left(\vec{k}_{i,j} \cdot \vec{r} + \frac{\gamma_{i,j} - \gamma_{-i,-j}}{2}\right) \cos\left(\omega t + \frac{\gamma_{i,j} + \gamma_{-i,-j}}{2}\right) \quad \text{EQ. 1}$$

where $$\vec{k}_{i,j} = \hat{k}_{i,j} \frac{(2\pi \sin\theta)}{\lambda}$$

$\hat{k}_{i,j}$ is the unit vector parallel to $\vec{k}_{i,j}$ $\lambda$ is the wavelength of the light $$\theta = \tan^{-1}\left(\frac{\sqrt{(i \times h)^2 + (j \times v)^2}}{f}\right)$$

h is the smallest horizontal distance between the centers of two SLM pixels v is the smallest vertical distance between the centers of two SLM pixels f is the focal length of the lens $\omega$ is the optical frequency t is the time and $\gamma_{i,j}$ and $\gamma_{-i,-j}$ are the phases of the beams as measured at t=0 at the point (x=y=0, $z_0$) shown in FIG. 6.

The phase of each beam is controlled or adjusted by the corresponding SLM pixel. Thus the SLM 90 controls the phase of each beam relative to the others. By changing the relative phase, the SLM causes the pattern to shift parallel to the direction of $\hat{k}_{i,j}$ producing a phase offset 98.

The $\vec{k}_{i,j}$'s resulting from the SLM pixels correspond to the latice vectors of a 2 dimensional Bravais lattice as described *Solid State Physics* by Neil W. Ashcroft and N. David Mermin, 1976, chapter 5 (incorporated by reference herein).

This Bavais lattice has primitive vectors, $(\vec{k})_{1,0}$ and $(\vec{k})_{0,1}$:

$$\vec{k}_{1,0} = \hat{x} \frac{2\pi}{\lambda} \sin\left[\arctan\left(\frac{h}{f}\right)\right] \quad \text{EQ. 2}$$

$$\vec{k}_{0,1} = \hat{y} \frac{2\pi}{\lambda} \sin\left[\arctan\left(\frac{v}{f}\right)\right] \quad \text{EQ. 3}$$

This example of the invention is capable of constructing Fourier eigenfunction patterns on the detector array having $\vec{k}_{i,j}$'s corresponding to lattice vectors of this Bravais lattice.

Note that the source coherence length also determines the number of fringes resulting from the above arrangement.

The minimum coherence length, l, is approximately given by:

$$l = s \times \lambda \quad \text{EQ. 4}$$

where s is the number of fringes and

λ the wavelength of the light.

However, for best performance, l should be many times larger and can be determined empirically by examining the output of an actual hardware implementation.

Continuing with the example, consider a discrete Fourier transform of a two dimensional function, $F(\vec{r})$, which can be represented as:

$$A_{m,n} = \frac{1}{a} \int_{-\frac{a}{2},-\frac{a}{2}}^{+\frac{a}{2},+\frac{a}{2}} F(\vec{r}) e^{-i\vec{k}_{m,n} \cdot \vec{r}} d^2\vec{r} \quad \text{EQ. 5}$$

where $A_{m,n}$ is the complex expansion coefficient, m and n are indices which identify the magnitude and orientation of the radial spatial frequency vector in two dimensional space, $\vec{r}$ is the position vector in the x,y plane, $F(\vec{r})$ or equivalently F(x, y) is the original function, a is the range for the two variables of F(x, y), here assumed centered about zero, and $$\vec{k}_{m,n} = \frac{2\pi}{a}(m \times \hat{x} + n \times \hat{y})$$

is the radial spatial frequency vector.

Given a set of data, $(\vec{k}_{m,n}, A_{m,n})$, the desired function, $F(\vec{r})$, is obtained by constructing the Fourier eigenfunctions, multiplying them by the corresponding expansion coefficients, and summing the resulting terms as in equation 6 below:

$$F(\vec{r}) = \frac{1}{a} \sum_{m,n} A_{m,n} e^{i\vec{k}_{m,n} \cdot \vec{r}} \quad \text{EQ. 6}$$

The expansion coefficients introduce both amplitude and phase in each term of equation 6. However, the optical portion of the invention uniquely uses a phase-only SLM in the generation of the function $F(\vec{r})$. This can be understood by rewriting equation 6 as:

$$F(\vec{r}) = \frac{1}{a} \sum_{m',n} (A_{m'n} + A_{-m',-n}) \cos(\vec{k}_{m'n} \cdot \vec{r}) + \quad \text{EQ. 7}$$

$$i(A_{m'n} - A_{-m',-n}) \sin(\vec{k}_{m'n} \cdot \vec{r})$$

Or as:

$$\text{Re} F(\vec{r}) = \frac{1}{a} \sum_{m'n} \text{Re}(A_{m'n} + A_{-m',-n}) \cos(\vec{k}_{m'n} \cdot \vec{r}) - \quad \text{EQ. 8}$$

$$\text{Im}(A_{m'n} - A_{-m',-n}) \sin(\vec{k}_{m'n} \cdot \vec{r})$$

and $$\text{Im} F(\vec{r}) = \frac{1}{a} \sum_{m'n} \text{Im}(A_{m'n} + A_{-m',-n}) \cos(\vec{k}_{m'n} \cdot \vec{r}) + \quad \text{EQ. 9}$$

$$\text{Re}(A_{m'n} - A_{-m',-n}) \sin(\vec{k}_{m'n} \cdot \vec{r})$$

where m' is restricted to positive values.

The terms in the sums of equations 8 and 9 above are real and of the form G cos θ+H sin θ which can be rewritten as:

$$G \cos \theta + H \sin \theta = L \times (T \cos \theta + W \sin \theta) \quad \text{EQ. 10}$$

where L is chosen as real and positive so that $\sqrt{W^2 + T^2} \leq 2$

We thus have the following identity:

$$W \cos \theta + T \sin \theta = \cos(\alpha + \theta) + \cos(\beta + \theta) \quad \text{EQ. 11}$$

where $$\alpha = \tan^{-1}\left(\frac{-T}{W}\right) - \cos^{-1}\left(\frac{\sqrt{W^2 + T^2}}{2}\right) \quad \text{EQ. 12}$$

and $$\beta = \tan^{-1}\left(\frac{-T}{W}\right) + \cos^{-1}\left(\frac{\sqrt{W^2 + T^2}}{2}\right) \quad \text{EQ. 13}$$

Using equations 10, 11, 12 and 13, and attaching appropriate indices to α and β, (R for real and I for imaginary), equations 8 and 9 can be rewritten as:

$$\text{Re} F(\vec{r}) = \frac{L^R}{a} \sum_{m'n} \left[ \cos(\vec{k}_{m'n} \cdot \vec{r} + \alpha^R_{m',n}) + \cos(\vec{k}_{m'n} \cdot \vec{r} + \beta^R_{m',n}) \right] \quad \text{EQ. 14}$$

$$= \frac{L^R}{a} \sum_{m'n} \cos(\vec{k}_{m'n} \cdot \vec{r} + \alpha^R_{m',n}) + \frac{L^R}{a} \sum_{m'n} \cos(\vec{k}_{m'n} \cdot \vec{r} + \beta^R_{m',n})$$

$$= (F^R)_\alpha + (F^R)_\beta$$

$$\text{Im} F(\vec{r}) = \frac{L^I}{a} \sum_{m'n} \left[ \cos(\vec{k}_{m'n} \cdot \vec{r} + \alpha^I_{m'n}) + \cos(\vec{k}_{m'n} \cdot \vec{r} + \beta^I_{m',n}) \right] \quad \text{EQ. 15}$$

$$= \frac{L^I}{a} \sum_{m'n} \cos(\vec{k}_{m'n} \cdot \vec{r} + \alpha^I_{m'n}) + \frac{L^I}{a} \sum_{m'n} \cos(\vec{k}_{m'n} \cdot \vec{r} + \beta^I_{m',n})$$

$$= (F^I)_\alpha + (F^I)_\beta$$

where $L^R =$ EQ. 16

$$\text{Max} \sqrt{[\text{Re}(A_{m',n} + A_{-m',-n})]^2 + [\text{Im}(A_{m',n} - A_{-m',-n})]^2}$$

$$L^I = \text{Max} \sqrt{[\text{Im}(A_{m',n} + A_{-m',-n})]^2 + [\text{Re}(A_{m',n} - A_{-m',-n})]^2} \quad \text{EQ. 17}$$

and $(F^R)_\alpha$, $(F^R)_\beta$, $(F^I)_\alpha$, and $(F^I)_\beta$ are functions of $\vec{r}$ That is: $L^R$ and $L^I$ are the maximum values attained by the square roots over all the values of m' and n and remain constant during the sum over m' and n. Further:

$$\alpha_{m',n}^{R} = \tan^{-1}\left(\frac{\text{Im}(A_{m',n} - A_{-m',-n})}{\text{Re}(A_{m',n} + A_{-m',-n})}\right) + \quad \text{EQ. 18}$$

$$\cos^{-1}\left(\frac{\sqrt{[\text{Re}(A_{m',n} + A_{-m',-n})]^2 + [\text{Im}(A_{m',n} - A_{-m',-n})]^2}}{2L^R}\right)$$

$$\beta_{m',n}^{R} = \tan^{-1}\left(\frac{\text{Im}(A_{m',n} - A_{-m',-n})}{\text{Re}(A_{m',n} + A_{-m',-n})}\right) - \quad \text{EQ. 19}$$

$$\cos^{-1}\left(\frac{\sqrt{[\text{Re}(A_{m',n} + A_{-m',-n})]^2 + [\text{Im}(A_{m',n} - A_{-m',-n})]^2}}{2L^R}\right)$$

$$\alpha_{m',n}^{I} = -\tan^{-1}\left(\frac{\text{Re}(A_{m',n} + A_{-m',-n})}{\text{Im}(A_{m',n} - A_{-m',-n})}\right) + \quad \text{EQ. 20}$$

$$\cos^{-1}\left(\frac{\sqrt{[\text{Re}(A_{m',n} + A_{-m',-n})]^2 + [\text{Im}(A_{m',n} + A_{-m',-n})]^2}}{2L^I}\right)$$

$$\beta_{m',n}^{I} = -\tan^{-1}\left(\frac{\text{Re}(A_{m',n} + A_{-m',-n})}{\text{Im}(A_{m',n} - A_{-m',-n})}\right) - \quad \text{EQ. 21}$$

$$\cos^{-1}\left(\frac{\sqrt{[\text{Re}(A_{m',n} + A_{-m',-n})]^2 + [\text{Im}(A_{m',n} + A_{-m',-n})]^2}}{2L^I}\right)$$

Equations 14 and 15 no longer involve amplitude; but compared to equations 8 and 9 the total number of terms have been doubled resulting in two series. The two series of equations 14 provide the real part of the function, $F(\vec{r})$, and those of equations 15 provide the imaginary part. The invention generates the function $F(\vec{r})$ by first determining $(F^R)_\alpha$, $(F^R)_\beta$, $(F^I)_\alpha$, and $(F^I)_{62}$ separately; and then combining the results:

$$F(\vec{r}) = (F^R)_\alpha + (F^R)_\beta + i \times [(F^I)_{60} + (F^I)_\beta] \quad \text{EQ. 22}$$

Consider a sample data set which contain only those spatial frequency vectors that correspond to the Bravais lattice of the SLM then i=m and j=n. Then, first each pixel (m', n) of the SLM is adjusted so that the phase delay is $\alpha^R_{m',n}$ and that of each pixel, (-m',-n) is $\alpha^R_{m',n}$. Then the laser beam is allowed to enter the system of FIG. 1, 4, or 5, illuminating the PMA and eventually illuminating the detector array. The resulting electric field amplitude produced on the detector array as a function of the x and y coordinates is proportional to the real part of the function $(F^R)_\alpha$. When sufficient energy has been absorbed by the detector array, the laser beam is discontinued and the detector array is addressed and its contents directed to an A to D converter and then into the memory of a digital computer. This process is then repeated for $(F^R)_\beta$, $(F^I)_\alpha$, and $(F^I)_\beta$. The terms are then processed as set forth in equation 22 to form the desired function $F(\vec{r})$.

Note, however, that for square-law detectors the output is actually proportional to the square of the electric field. To reconstruct the actual functions $(F^R)_\alpha$, $(F^R)_\beta$, $(F^I)_\alpha$, and $(F^I)_\beta$ and finally $F(\vec{r})$, the invention uses an adaptation of a method described by A. Vander Lugt in "Signal Detection by Complex Spatial Filtering", IEEE Transactions on Information Theory, April 1964 (incorporated by reference herein). To implement this adaptation the invention provides the $k_0$ beam and the following equations:

$$(F^R)_\alpha = \frac{\sqrt{K \times V_\alpha(x, y)} - E_0}{C} \quad \text{EQ. 23}$$

and $$(F^R)_\beta = \frac{\sqrt{K \times V_\beta(x, y)} - E_0}{C} \quad \text{EQ. 24}$$

where $V_\alpha(x, y)$ or $V_\beta(x, y)$ are the voltages from the element at position (x,y) of the detector array, K is a scaling constant determined from the response of the detector array as described below regarding calibration, C is a scaling constant also described below in regard to calibration, and $E_0$ is the field of the $k_0$ beam described below, and likewise for $(F^I)_\alpha$ and $(F^I)_\beta$.

Figure 8:
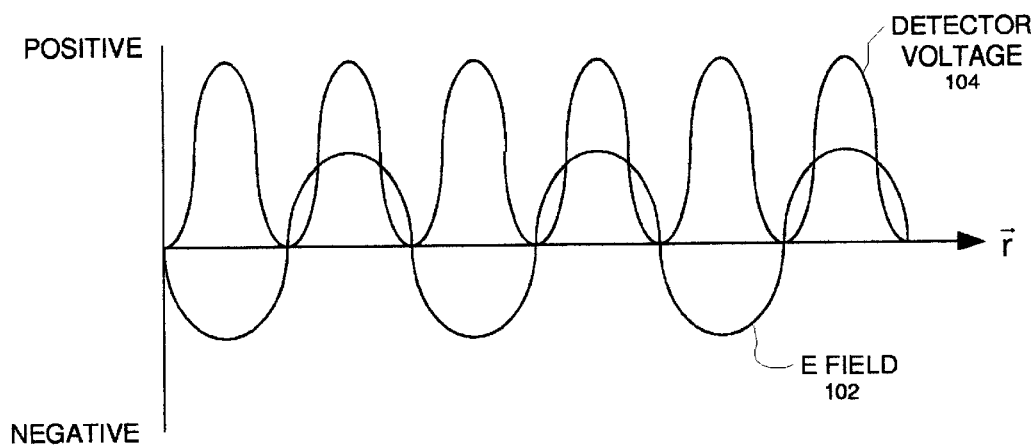
FIG. 8 is a graph of the electric field (E) along with the voltage produced by a square law detector array.
Figure 9:
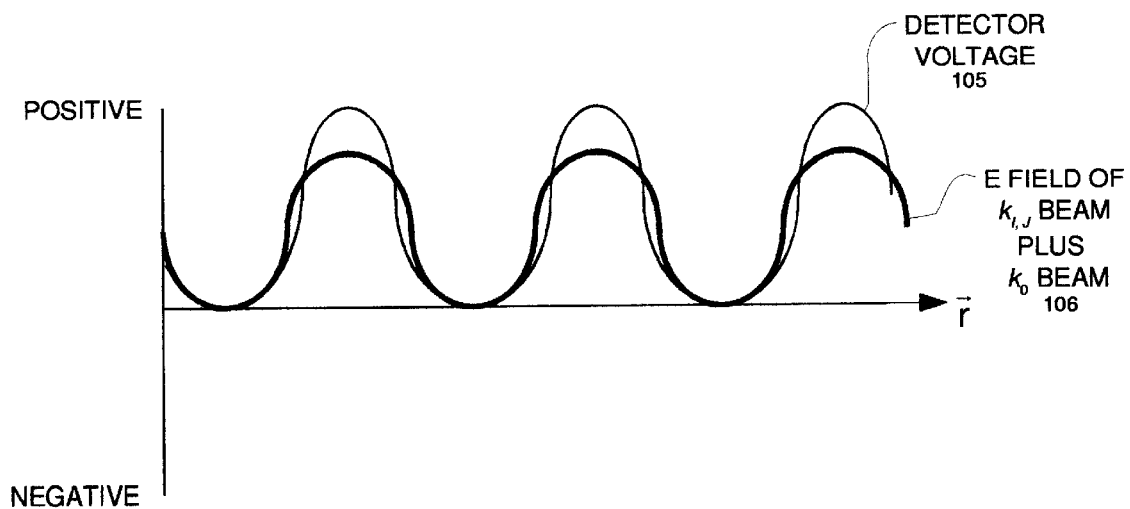
FIG. 9 is a graph of the electric field at the interference surface, showing the effect of the $k_0$ beam along with the voltage output of a square law detector array.

The sign (or phase) of the electric (E) field does not survive the squaring operation performed by the typical detector element. FIG. 8 represents an E field 102 at some time t, at the surface of the detector array along with the voltage 104 produced by the elements (after smoothing the discontinuities caused by the discrete spatial sampling of the detector array). Though the sign of the E field 102 is negative during part of each cycle, the voltage 104 from the detector elements is always positive. However, by adjusting the phase and amplitude of the $k_0$ beam and adding it to the E field produced by the interference of the pixel beams from the SLM, the total E field 106 becomes positive as shown in FIG. 9. The subsequent squaring operation performed by the detector elements does not alter the signs which are already positive and consistant with voltage 105. Equations 23 and 24 recover the original E field by first taking the square root and then subtracting out the constant $E_0$ term. Note that the above explanation used a time during the optical oscilation at which the E field of the $k_0$ beam is positive. The same preservation of sign is actually independent of time since the $k_0$ beam is coherent with the beams from the SLM's as discussed earlier. Further, the phase of the $k_0$ beam can be alternatively set to $\pm \pi$ to recover the sign information if $E_0$ is added rather than subtracted in equations 23 and 24.

Method II

The invention provides other methods of operation for producing transforms. As a second method, again consider Fourier transforms. The Fourier lens shown in the drawings actually directly forms the Fourier transform of the spatial light distribution at the pixel modulator assembly on the detector array. So, given a set of data, ($\vec{k}_{m,n}$, $A_{m,n}$), and assuming that the: $\vec{k}_{m,n}$'s correspond to the previously discussed Bravais lattice vectors for the hardware configuration (that is: i=m and j=n), the invention constructs the function, F(x, y) as follows:

$$\text{let } A_{m,n} = L \times Q_{m,n}, \quad \text{EQ. 25}$$

where L is chosen as positive and real, such that $|Q_{m,n}| \leq 2$, apply the following identity:

$$R \times e^{i\theta} = e^{i\alpha} + e^{i\beta} \text{ for } R \leq 2 \quad \text{EQ. 26}$$

where $$\alpha = \theta + \cos^{-1}(R/2) \quad \text{EQ. 27}$$

and $$\beta = \theta - \cos^{-1}(R/2) \quad \text{EQ. 28}$$

producing:

$$Q_{m,n} = e^{i\alpha_{m,n}} + e^{i\beta_{m,n}} \quad \text{EQ. 29}$$

with $$\theta_{m,n} = \tan^{-1}\left(\frac{\text{Im}Q_{m,n}}{\text{Re}Q_{m,n}}\right) \quad \text{EQ. 30}$$

and $$\alpha_{m,n} = \theta_{m,n} + \cos^{-1}\left(\frac{|Q_{m,n}|}{2}\right) \quad \text{EQ. 31}$$

$$\beta_{m,n} = \theta_{m,n} - \cos^{-1}\left(\frac{|Q_{m,n}|}{2}\right) \quad \text{EQ. 32}$$

The values for $\alpha_{m,n}$ are adjusted by the calibration results, described below and loaded into the SLM with i=m and j=n. Again, as in the earlier example discussed with respect to FIG. 1, 4, or 5, the laser is turned on to produce the Fourier transform pattern on the detector array, this time producing $F_\alpha(\vec{r})$, a portion of both the real an imaginary part of $F(\vec{r})$ simultaneously. Next, the procedure is repeated to produce $F_\beta(\vec{r})$. These results are then added to produce $F(\vec{r})$.

However, again since the detector array is a square law device, the phase information is not directly preserved and communicated to the detector array output. To recover the phase and thence $F_\alpha(\vec{r})$ and $F_\beta(\vec{r})$, the invention provides the $k_0$ beam and the following equations.

Consider that the Fourier transform pattern of $F_\alpha(\vec{r})$ is proportional to the electric field on the surface of the detector array which in complex representation is:

$$C \times F_\alpha(\vec{r}) \times e^{i\omega t} = E(\vec{r})e^{i\omega t} \quad \text{EQ. 33}$$

where

C is the constant of proportionality as in equations 23 and 24. and

ω is the optical radial, temporal frequency.

This can be rewritten as:

$$C \times F_\alpha(\vec{r}) \times e^{i\omega t} = [u(\vec{r}) + iv(\vec{r})] \times e^{i\omega t} \quad \text{EQ. 34}$$

The invention adds the $k_0$ beam to this field:

$$[E_0 \times e^{i\phi} + C \times F_\alpha(\vec{r})] \times e^{i\omega t} = [u(\vec{r}) + iv(\vec{r}) + E_0 \times e^{i\phi}] \times e^{i\omega t} \quad \text{EQ. 35}$$

where $\phi$ is the phase of the $k_0$ beam at t=0 at the detector array surface at the point $\vec{r}$, and $E_0$ is the magnitude of the $k_0$ beam (positive by definition).

The output from the detector array (after smoothing the discontinuities caused by its discrete spatial sampling) is a voltage:

$$K \times V(\vec{r}) = [u(\vec{r})]^2 + [v(\vec{r})]^2 + E_0^2 + 2u(\vec{r}) \times E_0 \cos\phi - 2v(\vec{r}) \times E_0 \sin\phi \quad \text{EQ. 36}$$

where K is a scaling constant as in equations 23 and 24. The invention provides means to adjust the phase of the $k_0$ beam which can be used to change $\phi$ in equation 35. Adjusting $\phi$ equal $\pi/4$ produces:

$$K \times V_{\pi/4}(\vec{r}) = [u(\vec{r})]^2 + [v(\vec{r})]^2 + E_0^2 + \sqrt{2}E_0 u(\vec{r}) - \sqrt{2}E_0 v(\vec{r}) \quad \text{EQ. 37}$$

Adjusting $\phi$ equal to $-\pi/4$ produces:

$$K \times V_{-\frac{\pi}{4}}(\vec{r}) = [u(\vec{r})]^2 + [v(\vec{r})]^2 + E_0^2 + \sqrt{2}E_0 u(\vec{r}) + \sqrt{2}E_0 v(\vec{r}) \quad \text{EQ. 38}$$

Subtracting equation 37 from equation 38 produces the imaginary part: of $C \times F_\alpha(\vec{r})$:

$$\text{Im}[C \times F_\alpha(\vec{r})] = v(\vec{r}) = \frac{K}{2E_0\sqrt{2}}\left[V_{-\frac{\pi}{4}}(\vec{r}) - V_{\frac{\pi}{4}}(\vec{r})\right] \quad \text{EQ. 39}$$

Alternatively, adjusting $\phi$ equal to $3\pi/4$ produces:

$$K \times V_{\frac{3\pi}{4}}(\vec{r}) = [u(\vec{r})]^2 + [v(\vec{r})]^2 + E_0^2 - \sqrt{2}E_0 u(\vec{r}) - \sqrt{2}E_0 v(\vec{r}) \quad \text{EQ. 40}$$

Subtracting equation 40 from equation 37 produces the real part of $C \times F_{60}(\vec{r})$:

$$\text{Re}[C \times F_\alpha(\vec{r})] = u(\vec{r}) = \frac{K}{2E_0\sqrt{2}}\left[V_{\frac{\pi}{4}}(\vec{r}) - V_{\frac{3\pi}{4}}(\vec{r})\right] \quad \text{EQ. 41}$$

This result combined with the result from equation 39 produces:

$$C \times F_{60}(\vec{r}) = u(\vec{r}) + iv(\vec{r}) \quad \text{EQ. 42}$$

The above process is then repeated to obtain $C \times F_\beta(\vec{r})$.

The function $F_\alpha(\vec{r}) = F_\alpha(\vec{r}) + F_\beta(\vec{r})$ is thus obtained in terms of x and y using the calibrated values for K and C and equations 37 through 42. Note that other combinations of values for the $k_0$ phase can be used. It is only necessary to use combinations which will permit solving for the desired terms.

Application of Method I

Figure 10:
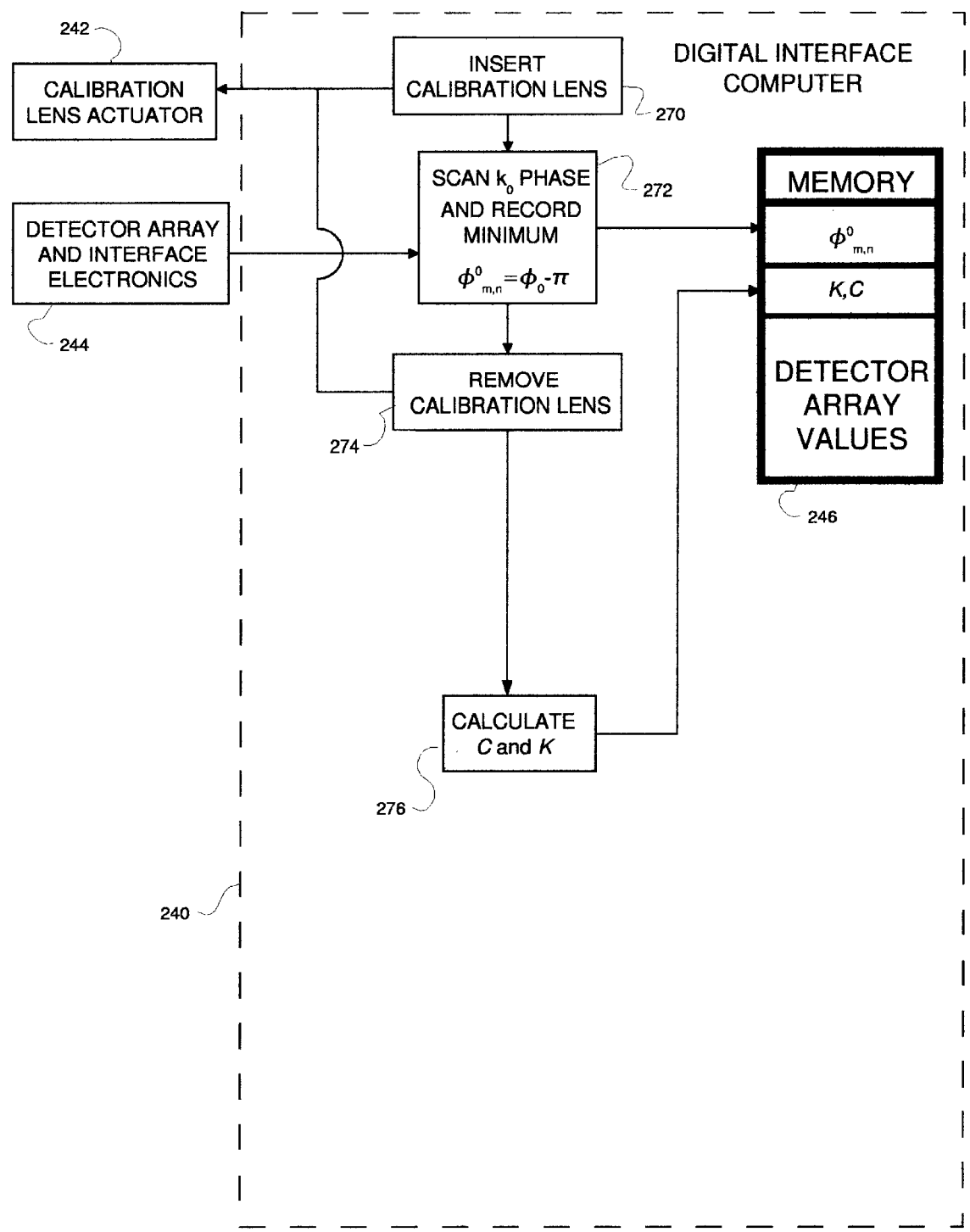
FIG. 10 illustrates the calibration function performed by a digital interface computer.
Figure 11:
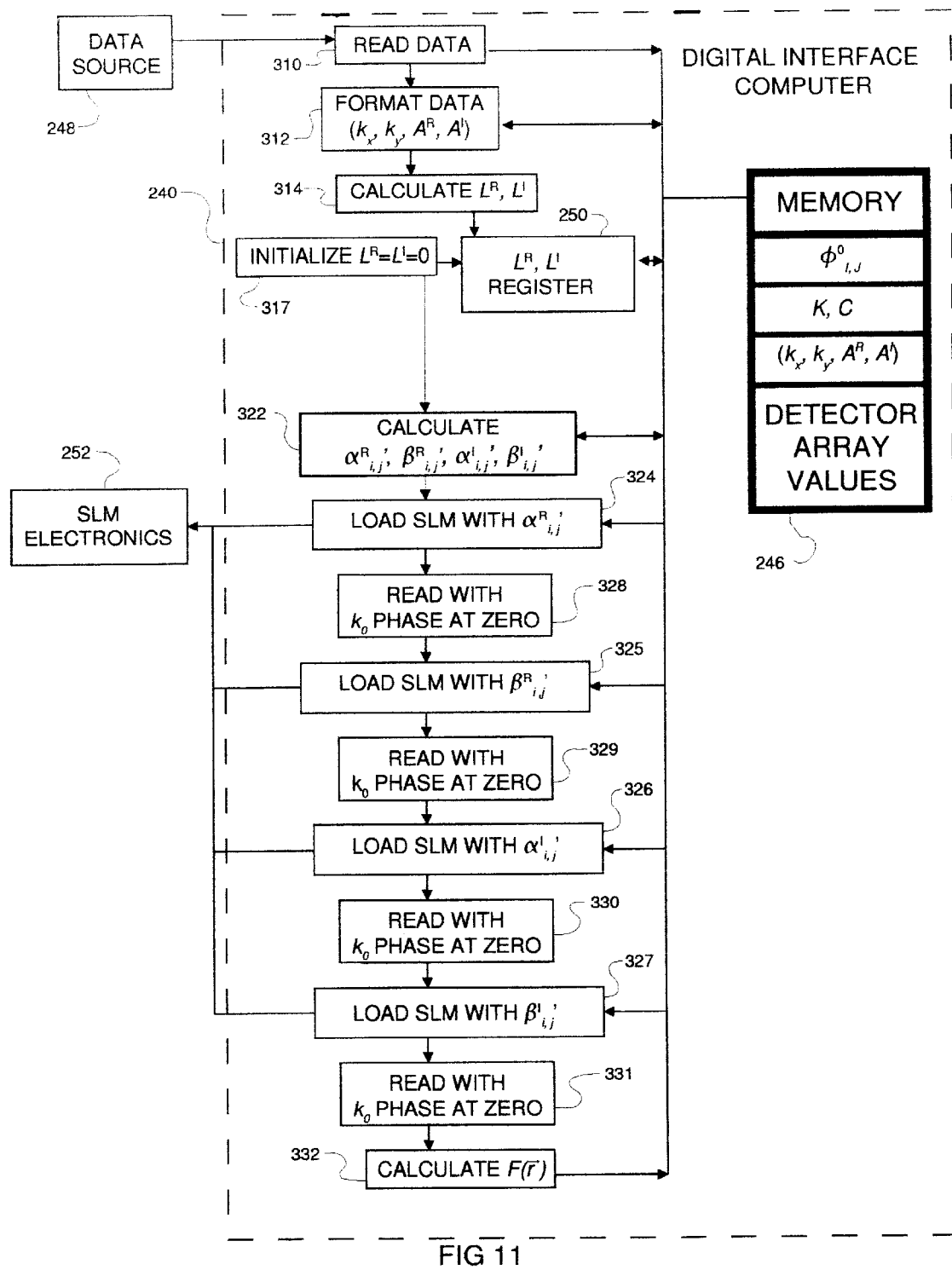
FIG. 11 depicts the first method of the present invention.
Figure 12:
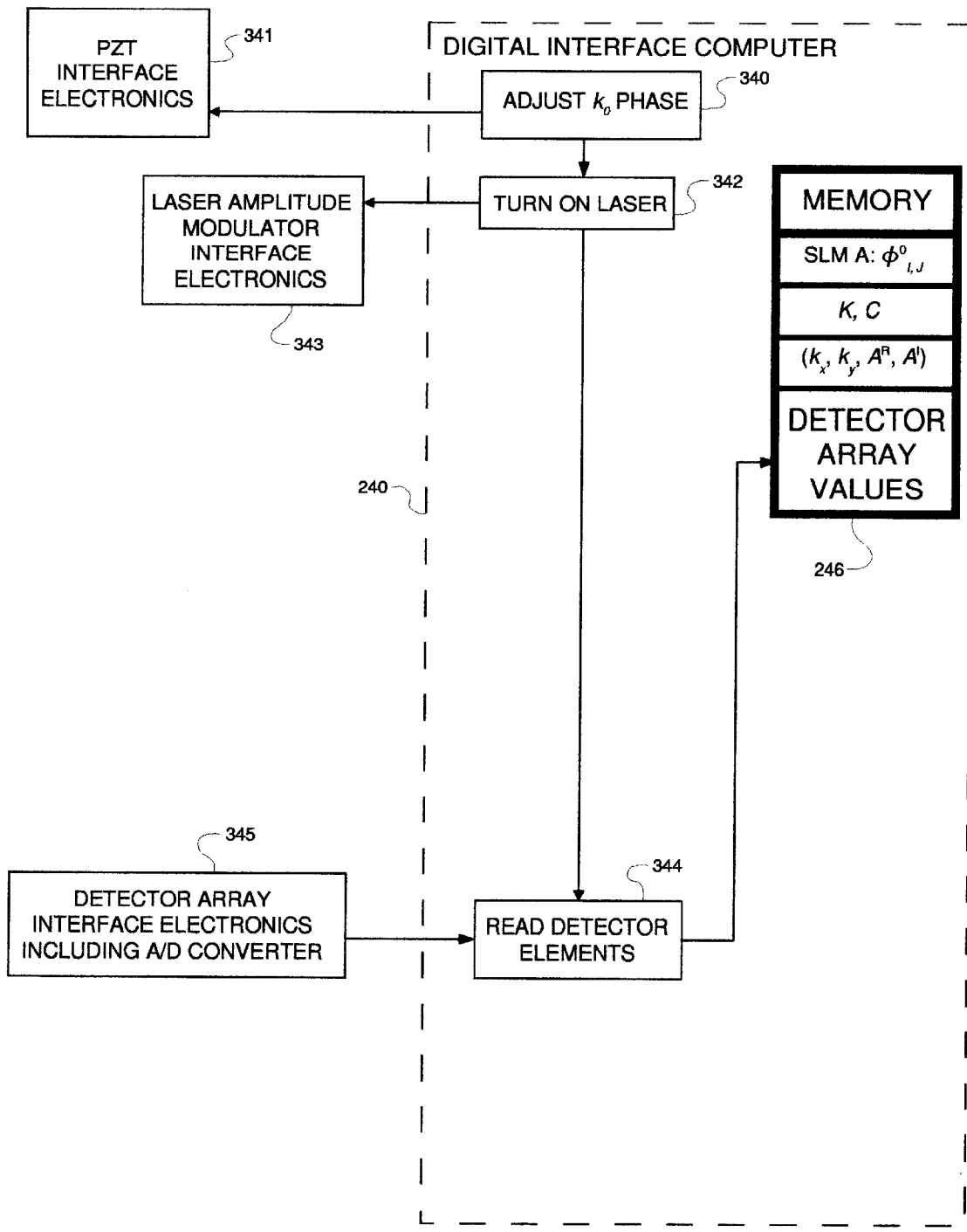
FIG. 12 shows the read operation.

The application of the invention for the first method is shown in FIG. 11 and relates to FIG. 1. It involves, additionally, a calibration function shown in FIG. 10 and a read function shown in FIG. 12. Referring to FIGS. 10, 11, and 12 the digital interface computer 240 is preferably a desk top type with a Pentium II® processor or equivalent equipped with suitable interface electronics to interface to a detector array, an A/D converter, a mechanical actuator, and PZT actuator.

The calibration function of FIG. 10 involves two major operations. The first is determining the phase delay caused by each one of the SLM pixels in the absense of an electrical input and the second is to determine the value of the constants for equations 23 and 24. The determination of the phase delay in the first operation is best made with respect to some reference. A suitable reference can be supplied by an implementation of the $k_0$ beam which is assumed in the procedure that follows. The calibration function, as well as the hardware that participates in the operations are depicted in FIG. 10. In the first operation, the digital interface computer 240 inserts 270 the calibration lens 64 into the $k_{i,j}$ circuit by a digitally controlled actuator 242 producing an image of the PMA 20 of FIG. 1 or PMA 54 of FIGS. 4 and 5 on the detector array 30. Next, the $k_0$ beam is turned on and the phase of the beam is adjusted (scanned) 272 by the PZT 40 which moves the mirror 36 along the direction indicated by the arrows 59 of FIG. 1 or by the PZT 62 and mirror 58 of FIG. 4 or 5. Alternatively, the phase can be adjusted by planar phase modulator as shown in FIG. 4.

For each pixel of the illuminated PMA, the computer 240 through the detector array 30 and the interface electronics 244, including an A/D converter, records the value, $\phi_0$, at which the minimum intensity is present at the corresponding element. The computer 240 then uses the following equation to calculate the zero input phase delay for each pixel:

$$(\phi^0)_{i,j} = \phi_0 - \pi \qquad \text{EQ. 43}$$

These results are then stored in a memory 246 of the computer 240, such as RAM or a storage media such as a hard drive disc. The calibration lens 64 is then removed 274.

The values for $\alpha_{i,j}'$ and $\beta_{i,j}'$ to be loaded into each pixel of the PMA are adjusted by the following equations:

$$\alpha_{i,j}' = \alpha_{i,j} - (\phi^0)_{i,j}$$

$$\beta_{i,j}' = \beta_{i,j} - (\phi^0)_{i,j} \qquad \text{EQ. 44}$$

That is, because in the absense of input the PMA 20 already produces a residual delay, it is necessary to reduce the input by this amount. Further, since the system is unaffected by a phase change of $2\pi$, the digital computer 240 adds or subtracts $2\pi$ until the result for $\alpha_{i,j}'$ is between zero and $2\pi$. Note that many methods can be used to obtain $(\phi^0)_{i,j}$ some using for example the maximum intensity on the detector array element and adjusting equation 43 accordingly. Alternatively, each SLM pixel phase can be scanned instead of the $k_0$ beam.

The second calibration operation is the determination 276 of the two constants K and C in equations 23 and 24. This is most easily accomplished by using the invention to construct a known function, $F(\vec{r})$, from its Fourier transform and solving for C and K by comparison with the output of the detector array. This will be explained below regarding the read function of the digital interface computer.

Returning to FIG. 11, the application of the invention, first, the data from a data source 248, such as a disk file or a real time data stream is read 310. Next, formatting 312 is performed and includes reducing the incoming data into a list of numbers each of which corresponds to one and only one pixel location, (i, j). In a simple example the incoming data may be a list of vectors each represented as:

$$(\vec{k}_{m,n}, A_{m,n}) \qquad \text{EQ. 45}$$

where m=0, ±1, ±2, ... ±M n=0, ±1, ±2, ... ±N with M×N=total number of data vectors and with $$\vec{k}_{m,n} = |\vec{k}| \frac{(m \times \hat{x} + n \times \hat{y})}{\sqrt{m^2 + n^2}} \qquad \text{EQ. 46}$$

i,e: $(\vec{k}_{0,0}, A_{0,0})$, $(\vec{k}_{1,0}, A_{1,0})$, $(\vec{k}_{-1,0}, A_{-1,0})$, $(\vec{k}_{2,0}, A_{2,0})$, $(\vec{k}_{-2,0}, A_{-2,0})$ . . . $(\vec{k}_{0,1}, A_{0,1})$, $(\vec{k}_{1,1}, A_{1,1})$, $(\vec{k}_{-1,1}, A_{-1,1})$, $(\vec{k}_{2,1}, A_{2,1})$, $(\vec{k}_{-2,1}, A_{31\ 2,1})$ . . . $(\vec{k}_{M,N}, A_{M,N})$ Further in this example we assume that the radial spatial frequencies contained in the data are the same ones which can be produced by the PMA 20 on the detector array 30. That is, all of the $\vec{k}_{m,n}$'s contained in the input data are points on the Bravais lattice described above. In this example, formatting simply sets m and n indices of the SLM equal to the i and j indices respectively. Any (i, j)'s for which there are no data points are assigned coefficients with zero magnitude and any convenient phase: $(\vec{k}_{m,n}, A_{m,n}) \Rightarrow (k_{m,n}, 0)$ Input data which contains $\vec{k}$'s which are not lattice vectors of the Bravais lattice will require interpolation. Conventional algorithms are available for performing such interpolation which are dependent upon the nature of the data. The interpolation algorithms typically used for medical imaging and for synthetic aperture radar are suitable.

The system then determines values for $L^R$ and $L^I$ of equation 16 and 17 which are then stored. This involves calculating 314 a value for each $L^R$ and $L^I$ for the first data point's $A_{m,n}$ and storing these values in a register 250 (initially set 317 to zero). For each subsequent data point's $A_{m,n}$, new values for $L^R$ and $L^I$ are calculated. The values of $L^R$ and $L^I$ in the register are updated with larger from the set consisting of the existing values and the new values. That is, ultimately $L^R$ and $L^I$ are to be the maximum value attained by the values of the $A_{i,j}$'s in equations 16 and 17.

Next, the digital interface computer 240 calculates 322 $\alpha^R_{i,j}$, $\beta^R_{i,j}$, $\alpha^I_{i,j}$, and $\beta^I_{i,j}$ using equations 18 and 19 for the real part of the function and equations 20 and 21 when computing the imaginary part. The digital interface computer 240 then adjusts $\alpha^R_{i,j}$, $\beta^R_{i,j}$, $\alpha^I_{i,j}$, and $\beta^I_{i,j}$ by subtracting the zero input delay:

$$\alpha^R_{i,j}{}' = \alpha^R_{i,j} - (\phi^0)_{i,j} \qquad \text{EQ. 47}$$

$$\beta^R_{i,j}{}' = \beta^R_{i,j} - (\phi^0)_{i,j} \qquad \text{EQ. 48}$$

$$\alpha^I_{i,j}{}' = \alpha^I_{i,j} - (\phi^0)_{i,j} \qquad \text{EQ. 49}$$

$$\beta^I_{i,j}{}' = \beta^I_{i,j} - (\phi^0)_{i,j} \qquad \text{EQ. 50}$$

Next, the computer loads 324 one of the sets of numbers from one of equations 47 through 50. Though the order is inconsequencial, assume that the set of $\alpha^R_{i,j}$ of equation 47 is loaded 324 first into the SLM of PMA 20 via the interface 252. When the SLM has attained the state of phase delays corresponding to the input, the read 328 process described below is performed. Following the reading process, the set of $\beta^R_{i,j}{}'$ are loaded 325 into the SLM of PMA 20 via the interface SLM electronics 252 and then read 329 process is performed. If the imaginary part of $F(\vec{r})$ is desired the process proceeds with loading 326 of the set of $\alpha^I_{i,j}{}'$ this is followed by the read 330 operation. This is followed by the $\beta^I_{i,j}{}'$ load 327 which is followed by the read 331 process. Finally, the calculate 332 process is performed to produce $F(\vec{r})$.

The read process, depicted in FIG. 12 consists of adjusting 340 the phase of the $k_0$ beam by means of the PZT 40 of FIG. 1 or PZT 62 of FIG. 4 or 5, and the PZT interface electronics 341 as required in requesting operation of FIG. 11, turning 342 on the laser for a time, t, by means of the interface electronics 343 to accumulate sufficient energy at the detector array and then reading 344 the detector array elements into the digital interface computer 240 by means of the interface electronics 345.

To properly scale the result, constants C and K must be calculated as indicated in the calibration function shown in FIG. 10. These are system parameters, except for the effects or drift caused by, for example, environmental changes, should remain constant and independent of the particular data set being processed. As such they can be determined empirically by inputting data from the Fourier transforms of known functions into the transform generator and comparing the output of the detector array elements with the known functions through equations 23 and 24. Some possible known functions are F=0 and F(x,y)=sin(x). Note, the invention provides that both C and K can be different for each detector array element, necessitating storing a list of values, $C_{p,q}$ and $K_{p,q}$ for separately scaling the output of each element. Once C and K are determined they can be used to calculate 332 $F(\vec{r})$ for actual data by equations 22 through 24.

The invention also provides a method for reducing the effect of nonuniform pixel beam amplitude. Such nonuniformity may arise, for example, from variations in the size of the holes in the array of beam forming elements. To reduce this effect, the invention constructs a function having only one spatial frequency, which corresponds to an SLM pixel (i, j). The square root of maximum output voltage from the detector array is entered into a position (i, j) of the matrix containing the relative amplitudes of all SLM pixels. The process is repeated until a value is entered for each pixel of interest. This matrix is stored in digital memory. Then, in the case where the data lies on the Bravais lattice so that m=i and n=j, $A_{m,n}$ is replaced with $A_{i,j}/\xi_{i,j}$ where $\xi_{i,j}$ is the square root of the maximum voltage produced at the detector array by the function having spatial frequency corresponding to SLM pixel (i, j).

Application of Method II

Figure 13:
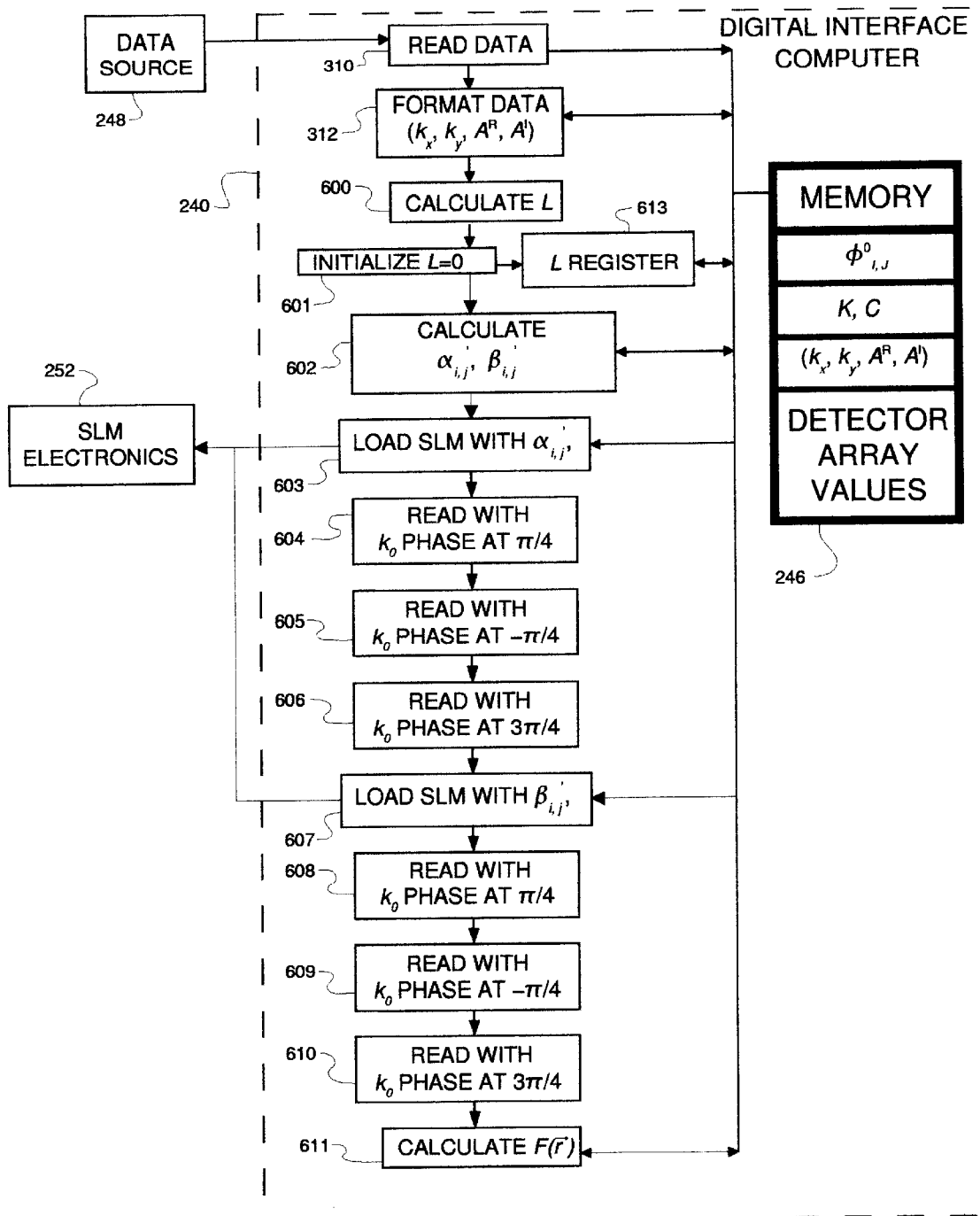
FIG. 13 shows the second method of the present invention.

The application of the invention for the second method is shown in FIG. 13 and relates to FIG. 1. It also involves, additionally, the calibration function shown in FIG. 10 and the read function shown in FIG. 12. Referring to FIG. 13 the digital interface computer 240 is preferably a desk top type with a Pentium II® processor or equivalent equipped with suitable interface electronics to interface to a detector array, an A/D converter, a mechanical actuator and PZT actuator.

The calibration function of FIG. 10 again involves two major operations. The first is determining the phase delay caused by each one of the SLM pixels in the absense of an electrical input and the second is to determine the value of the constants now for equations 33 through 42. The determination of the phase delay proceeds as discussed earlier in the description of the first method producing the set of $(\phi^0)_{i,j}$.

The values for $\alpha_{i,j}'$ and $\beta_{i,j}'$ to be loaded into each pixel of the PMA are adjusted by the following equations:

$$\alpha_{i,j}'=\alpha_{i,j}-(\phi^0)_{i,j} \qquad \text{EQ. 51}$$

$$\beta_{i,j}'=\beta_{i,j}-(\phi^0)_{i,j} \qquad \text{EQ. 52}$$

That is, because in the absense of input the PMA 20 already produces a residual delay, it is necessary to reduce the input by this amount. Further, since the system is unaffected by a phase change of $2\pi$, the digital computer 240 adds or subtracts $2\pi$ until the result for $\alpha_{i,j}'$ is between zero and $2\pi$. Note that many methods can be used to obtain $(\phi^0)_{i,j}$ some using for example the maximum intensity on the detector array element and adjusting equation 43 accordingly. Alternatively, each SLM pixel phase can be scanned instead of the $k_0$ beam.

The second calibration operation is the determination 276 of the two constants K and C now in equations 33 through 42. This is most easily accomplished by using the computer to construct a known function, $F(\vec{r})$, and solving for C and K by comparison with the output of the detector array. This will be explained below regarding the read function of the digital interface computer.

Returning to FIG. 13, first, the data from a data source 248, such as a disk file or a real time data stream is read 310.

Next, formatting 312 is performed and includes reducing the incoming data into a list of numbers each of which corresponds to one and only one pixel location, (i, j). In a simple example the incoming data may be a list of vectors each represented as:

$$(\vec{k}_{m,n}, A_{m,n}) \qquad \text{EQ. 53}$$

where m=0, ±1, ±2, . . . ±M n=0, ±1, ±2, . . . ±N with M×N=total number of data vectors and with $$\vec{k}_{m,n} = |\vec{k}|\frac{(m \times \hat{x} + n \times \hat{y})}{\sqrt{m^2 + n^2}} \qquad \text{EQ. 54}$$

i,e: $(\vec{k}_{0,0},A_{0,0})$, $(\vec{k}_{1,0},A_{1,0})$, $(\vec{k}_{-1,0},A_{-1,0})$, $(\vec{k}_{2,0},A_{2,0})$, $(\vec{k}_{-2,0},A_{-2,0})$ . . . $(\vec{k}_{0,1},A_{0,1})$, $(\vec{k}_{1,1},A_{1,1})$, $(\vec{k}_{-1,1},A_{-1,1})$, $(\vec{k}_{2,1},A_{2,1})$, $(\vec{k}_{-2,1},A_{-2,1})$ . . . $(\vec{k}_{M,N},A_{M,N})$ Further in this example we assume that the radial spatial frequencies contained in the data are the same ones which can be produced by the PMA 20 on the detector array 30. That is: all of the $\vec{k}_{m,n}$'s contained in the input data are points on the Bravais lattice described above. In this example, formatting simply sets m and n indices of the SLM equal to the i and j indices respectively. Any (i, j)'s for which there are no data points's are assigned coefficients with zero magnitude and any convenient phase: $(\vec{k}_{m,n}, A_{m,n})\Rightarrow(\vec{k}_{m,n}, 0)$.

Input data which contains $\vec{k}$'s which are not lattice vectors of the Bravais lattice will require interpolation. Conventional algorithms are available for performing such interpolation which are dependent upon the nature of the data. The interpolation algorithms typically used for medical imaging and for synthetic aperture radar are suitable.

The system then determines a value for L of equation 25 which is then stored. This involves calculating 600 a value for L for the first data point's $A_{m,n}$ and storing this value in a register 613 (initially set 601 to zero). For each subsequent data point's $A_{m,n}$, a new value for L is calculated. The value of L in the register is updated with the larger value from the set of the existing value and new value. That is: L is to be the maximum value attained by the values of the $A_{i,j}$'s in equation 25.

Next, the digital interface computer 240 calculates 602 $\alpha_{i,j}$ and $\beta_{i,j}$ using equations 25 through 32. The digital interface computer 240 then adjusts $\alpha_{i,j}$ and $\beta_{i,j}$ by subtracting the zero input delay:

$$\alpha_{i,j}'=\alpha_{i,j}-(\alpha^0)_{i,j} \qquad \text{EQ. 55}$$

$$\beta_{i,j}'=\beta_{i,j}-(\alpha^0)_{i,j} \qquad \text{EQ. 56}$$

Next, the computer loads one of the sets of numbers from either equation 55 or 56. Though the order is inconsequential, assume that the set of $\alpha_{i,j}'$ of equation 55 are loaded 603 first into the SLM of PMA 20 via the interface 252. When the SLM has attained the state of phase delays corresponding to the input, the reading processes 604, 605, and 606 described below are performed. Following the reading processes, the set of $\beta_{i,j}'$ are loaded 607 into the SLM of PMA 20 via the interface SLM electronics 252 and then reading processes 608, 609, and 610 are performed.

The read process of the results, depicted in FIG. 12 consists of adjusting 340 the phase of the $k_0$ beam by means of the PZT 40 of FIG. 1 or PZT 62 of FIG. 4 or 5 through the PZT interface electronics 341 as required in requesting operation of FIG. 13, turning 342 on the laser for a time, t, to accumulate sufficient energy at the detector array and then reading 344 the detector array elements into the digital interface computer 240. This process is repeated for all required phases of the $k_0$ beam.

Finally, the calculate 611 process is performed to produce $F(\vec{r})$.

To properly scale the result, constants C and K must be calculated as indicated in the calibration function shown in FIG. 10. Again, these are system parameters, except for the effects of drift caused by, for example, environmental changes, should remain constant and independent of the particular data set being processed. As such they can be determined empirically by inputting data from the Fourier transforms of known functions into the transform generator and comparing the output of the detector array elements with the known functions through equations 37 through 42. Some possible known functions are $F=0$ and $F(x,y)=\sin(x)$. Note, the invention provides that both C and K can be different for each detector array element, necessitating storing a list of values, $C_{p,q}$ and $K_{p,q}$ for separately scaling the output of each element. Once C and K are determined they can be used to calculate 611 $F(\vec{r})$ for actual data by equations 37 through 42.

Hardware Considerations

The implementation of the invention requires the selection of various hardware components which may introduce undesired effects or involve additional considerations. Reflective SLM's reflect some light which is incident upon the area between pixels. This reflected light will form a spot in the center of the detector array after being transformed by the Fourier lens. In order to read information for the function $F(\vec{r})$ from the detector array at this spot the invention provides that the image of the function, $F(\vec{r})$, can be shifted on the detector array a distance and direction $\vec{\delta}$ by adjusting the phase of each data point to be loaded the SLM by an amount $\gamma(\vec{k})$ given by:

$$\gamma(\vec{k}) \; \vec{\delta} \cdot \vec{k} \qquad \text{EQ. 57}$$

The actual distance and direction is best determined empirically.

The invention also provides that the optional array 22 of beam forming elements of FIG. 2 may be replaced or combined with a spatial filter. Such a filter may be for example, an amplitude attenuating device which attenuates those pixel beams near the center, (0, 0), more than those near periphery. Such a filter is useful for transforms of data sets having a greater density of sampled points at the lower spatial frequencies. Further, the optional array 22 of beam forming elements may be constructed as opaque and absorbing except for those pixels which are known ahead of time to correspond to data points. This is useful when the invention is used to process data sets containing the same spatial frequency points and when some SLM addressable space has no corresponding data points. Its use can reduce stray light and speed loading the SLM since fewer points need be addressed.

The invention also provides for the use of nonpixelated SLM's. Nonpixelated arrays can eliminate the need for interpolation when data points involve spatial frequencies which do not lie on a Bravais lattice corresponding to a pixelated SLM.

Figure 14:
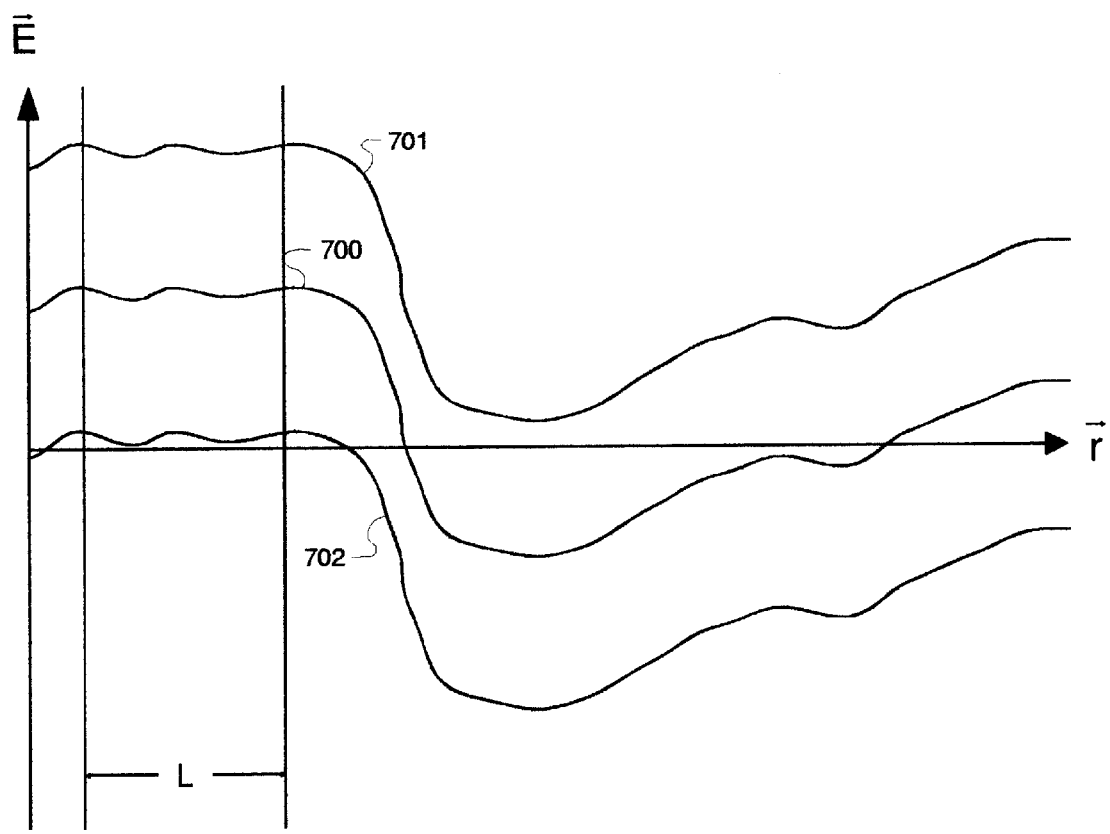
FIG. 14 shows shot noise reduction.

An additional consideration is the shot noise originating from typical detectors such as CCD or CID arrays. For each read operation the forgoing indicated that the laser is turned on until sufficient light has been absorbed by the detector array. However, CCD and CID arrays by their nature can absorb light only to a maximum at which point the capacitor elements are fully charged or saturated with electrons. The maximum number of electrons is typically from 64,000 to 500,000. The shot noise contribution to the signal is equal to the square root of the number of electrons. Thus for 400,000 electrons, the signal is known only to within 400,000±632. In applications where this is insufficient, the invention provides that the $k_0$ beam can be used to effectively extend the accuracy and dynamic range. This can be seen from FIG. 14 in which curve 700 represents the E field of a function generated by the first method but without any $k_0$ added. The $\vec{r}$ axis represents a coordinate axis along the surface of the detector array. Assume that the time is such that the E field is a maximum. Note that the E field is positive in some regions and negative in others. The foregoing method 1 using the $k_0$ beam as has been already explained will offset this E field so that this sign information can be recovered. The function E field plus this $k_0$ beam amplitude is represented by curve 701. Consider the region delineated as L. In this region the E field is positive for curve 701. The resulting number of electrons generated in the CCD array for this region will be proportional to the magnitude of this E field. As an example, assume that within this region the number of electrons after the laser turn on time is approximately 400,000 per CCD capacitor. The shot noise contribution will be ±632 electrons. That is, the function will only be known to within:

$$\frac{\sqrt{400632}}{\sqrt{400000}} - 1 = \sim 0.08\% \qquad \text{EQ. 58}$$

The $k_0$ beam can be used to reduce this uncertainty.

Consider curve 702 which is the result of adding a $k_0$ beam amplitude which reduces the total E field within the region L. The number of electons now generated in the capacitors of the CCD array within this region will be significantly lower. For the sake of example, assume that the number of electrons has now been reduced to approximately 100 per capacitor. The shot noise will now be ±20 which is near the typical dark current for CCD arrays. As indicated through equation 23, the output of the CCD array within this region for curve 702 is related to the function as follows:

$$(F^R)_\alpha \sqrt{\text{total number of eletrons}} - \sqrt{\#k_0} = \sqrt{400 \pm 20} - \sqrt{\#k_0} = 20 \pm 0.5 - \sqrt{\#k_0} \qquad \text{EQ. 59}$$

where $\#k_0$ is the equivalent number of electrons produced by the $k_0$ beam in the absense of any other signal (with the $k_{i,j}$ circuit blocked with a shutter).

For equation 59 to be useful it is necessary to determine $\sqrt{\#k_0}$ to higher accuracy than 0.08%. The invention provides two general methods by which $\sqrt{\#k_0}$ may be determined. Both of these involve an additional calibration procedure and storage of the results.

The first consists of blocking the $k_{i,j}$ circuit by, for example the absorbing shutter 7 of FIG. 1 to position 131; turning on the laser for a time t, allowing the $k_0$ beam to accumulate electrons in the CCD capacitors to the full linear range; reading the CCD array; storing the resulting reading for each pixel in the computer memory 246. These steps are repeated n times with the result that, aside from dark current noise, read noise, thermal noise, etc., the shot noise contribution is reduced by $\sqrt{n}$:

$$\sqrt{\#k_0} = \frac{\text{Total}}{n} \pm \frac{\sqrt{\text{Total}}}{\sqrt{n}} \qquad \text{EQ. 60}$$

where Total is the total number of electrons collected over the n measurements.

This calibration is independent of the nature of the data to be processed and therfore, needs be done only once if laser amplitude and detector sensitivity are maintained sufficiently constant by for example controlling temperature, laser current, etc.

Additional possibilities for eliminating the effects of drift is to employ an additional precision detector 9 placed to intercept a portion of the $k_0$ beam by means of the beamsplitter 8 both shown in FIG. 1. With such a detector, the output can be used either to monitor the laser power for use in a servo control circuit or directly integrated and used to normalize each of the n samples.

From the forgoing, it is clear that a range of $k_0$ magnitudes are useful for examining various portions of the curve 700. Toward this end, various measurements can be made of the power incident on detector 9 for various locations of the beam attenuating aperture 38. The results can be used to scale the results stored in the computer memory 246 from the n samples.

Note that the additional calibration procedure also reduces the error caused by the nonuniformity of the CCD array response. This is because the $k_0$ beam is used to cancel the the E field from the function transform. Thus, the detector serves somewhat as a null detector. This is seen from the example of equation 59 where:

$$20\pm0.5 << \sqrt{\#k_0} \approx \sqrt{400000}. \qquad \text{EQ. 61}$$

Using the $k_0$ beam to extend the dynamic range also applies to the second method of producing transforms with the additional consideration that the phase of the $k_0$ beam must be adjusted by any of the means already mentioned so as to cancel the function transform E field in the region of interest.

Figure 15:
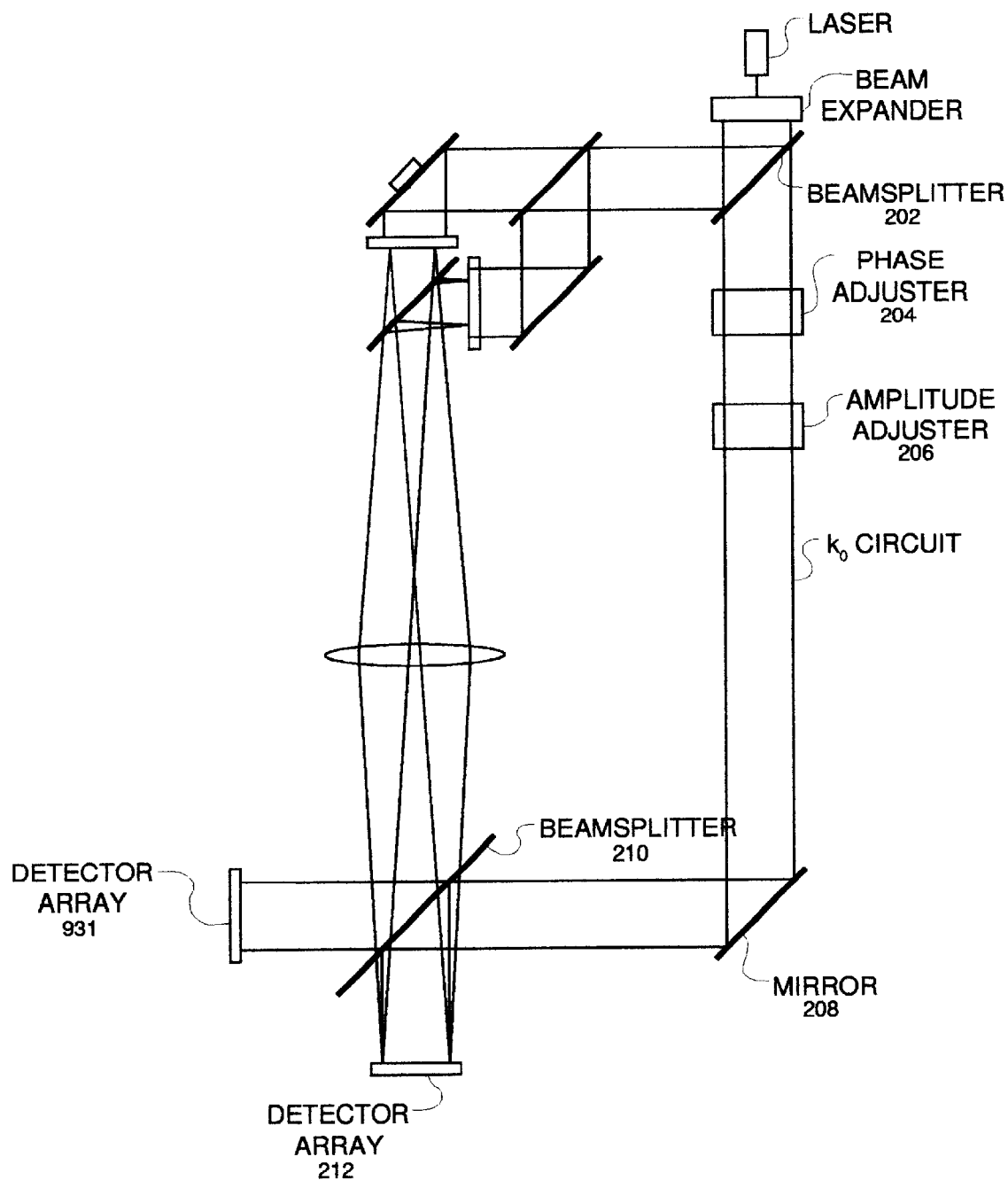
FIG. 15 depicts a full complex SML implementation.
Figure 16:
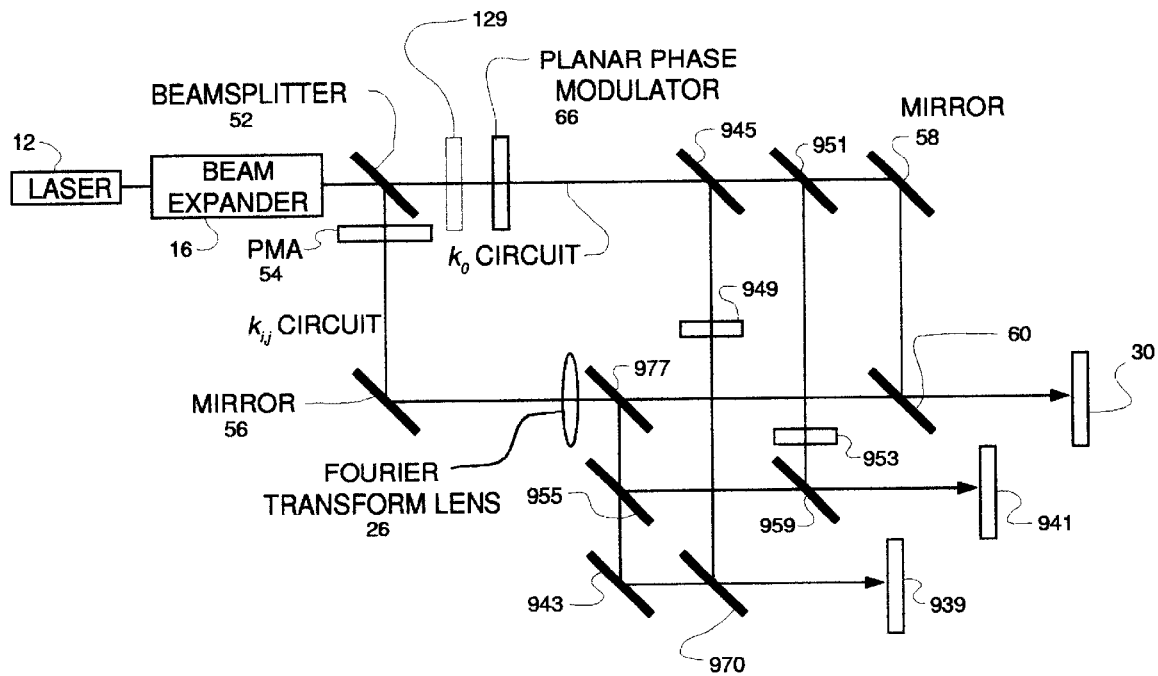
FIG. 16 depicts multiple detector arrays.

An alternative way of implementing the above method of extending the dynamic range is to use one or more additional detector arrays such as 930 in FIG. 4. In such an implementation, beamsplitter 60 can be chosen to have a transmission which causes the amplitude of the $k_0$ relative to the $k_{i,j}$ to be different on each detector array. For example, if the beamsplitter 60 transmits ⅓ of the incident power and reflects ⅔ of the incident power then the ratio of the $k_0$ amplitude to the $k_{i,j}$ amplitude on detector 30 will be twice the ratio of the $k_0$ amplitude to the $k_{i,j}$ amplitude on detector 930. The beamsplitter 52 can be chosen to control the absolute ratios or an optional amplitude modulator 129 can be added to the system to allow variable real-time control. FIG. 15 depicts an implementation of the above for the transform generator using the full complex SLM. Here beamsplitter 210 directs a portion of the pixel beams onto additional detector array 931 along with a portion of the $k_0$ beam. FIG. 16 depicts a scheme for using multiple additional detector arrays in the transform generator of FIG. 4 each having a different ratio of $k_0$ beam to pixel beam intensity. This scheme adds beamsplitters 945, 951, 955, 959, 970, and 977 and mirror 943 to direct the beams onto additional detector arrays 939 and 941. Optionally, amplitude and/or phase modulators 949 and 953 can be added to allow real-time control of the ratios.

Use of SLM with <2π Phase Delay

Another consideration regarding SLM's is the current availability of relatively inexpensive units designed mostly for video displays. These SLM's typically provide a maximum phase shift of π (180°) per pixel.

The invention provides a method which accommodates the use of π SLM's in, for example, the FIG. 1 embodiment. In this method the phases to be loaded into the SLM are considered as two groups. One group may include only phases less than or equal to π, and the other includes only these greater than π. First, the group less than or equal to π is loaded into the SLM. Pixels which are not included in this group are set to their zero input values. Then the light source 12 is turned on to expose the detector array 30 which is subsequently read into the memory 246 of the computer 240. The process is performed with the appropriate phases of the $k_0$ beam consistant with the use of equations 23, 24, 39, or 41. The digital interface computer 240 calculates the function corresponding to this phase group in the same manner as detailed above in equations 23 and 24, or 37 through 42. The result is a function $F_1(x, y)$. Next, the above is repeated for the other group of phases which are greater than π but this time the pixels not included in this group are set to produce a phase delay equal to their zero input value plus π. The result is a second function $F_2(x, y)$. Next, $F_2(x, y)$ is subtracted from $F_1(x, y)$ producing a new function which equals the desired function F plus terms equal to all the pixels with zero input values. The function F is then obtained by subtracting out the zero input result, $F_0(x, y, C, K)$ values which were stored in memory during the calibration process for this system as described below.

Figure 17:
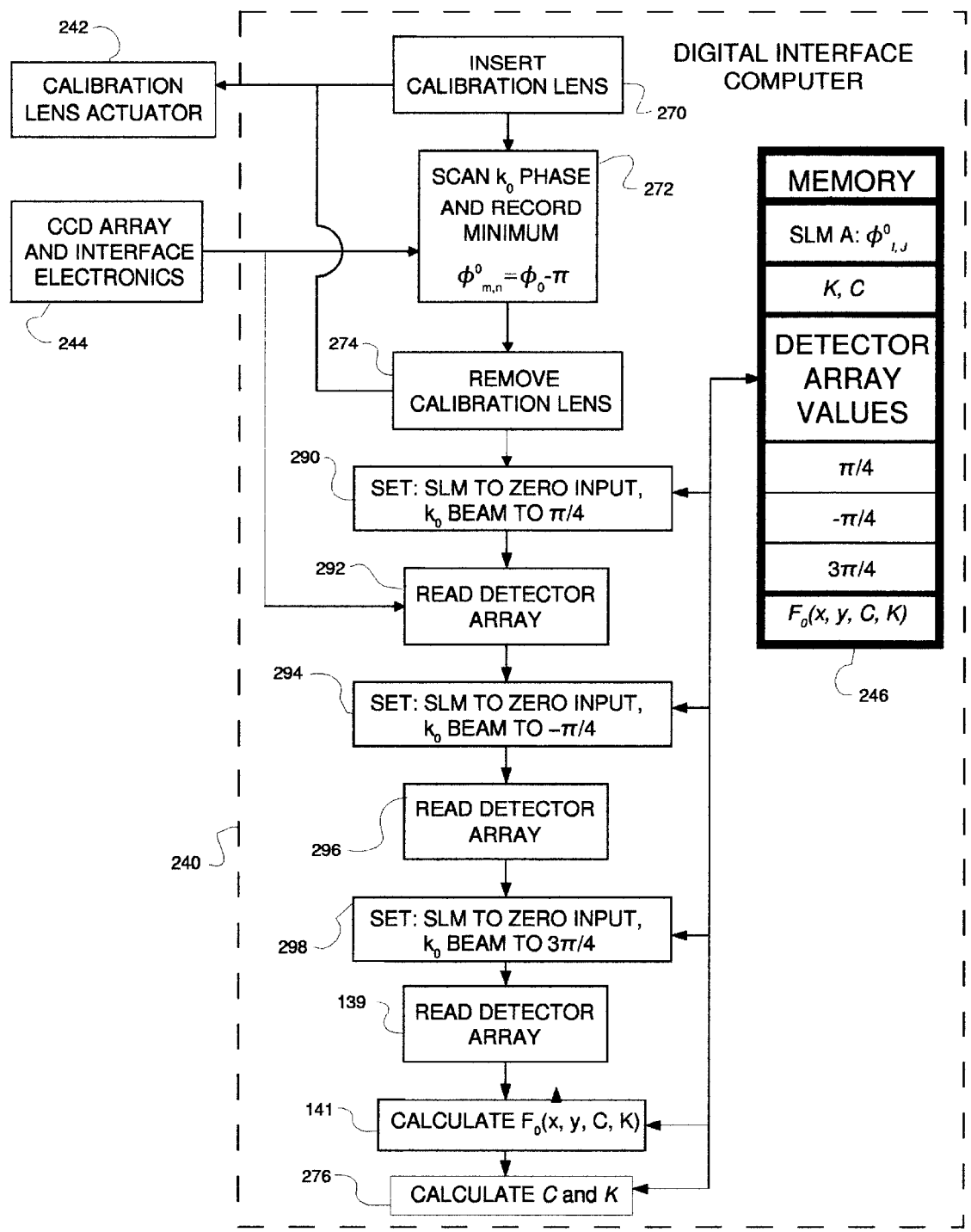
FIG. 17 depicts additional calibration.

FIG. 17 contains, in addition to the calibration steps of FIG. 10, the series of steps for calibrating a system using an SLM which only has the capacity to produce phase delays less than 2π. These steps are: set 290 SLM to zero input, $k_0$ beam to π/4, read 292 detector array, set 294 SLM to zero input, $k_0$ beam to −π/4, read 296 detector array, set 298 SLM to zero input, $k_0$ beam to 3π/4, read 139 detector array. Essentially, this process calculates 141 a function, $F_0(x, y, C, K)$, which is the result of operating the SLM with zero input signal. This function is constructed using the same formalism developed in EQS. 33 through 42. This series of steps is otherwise unnecessary.

Two SLM Configuration

Figure 18:
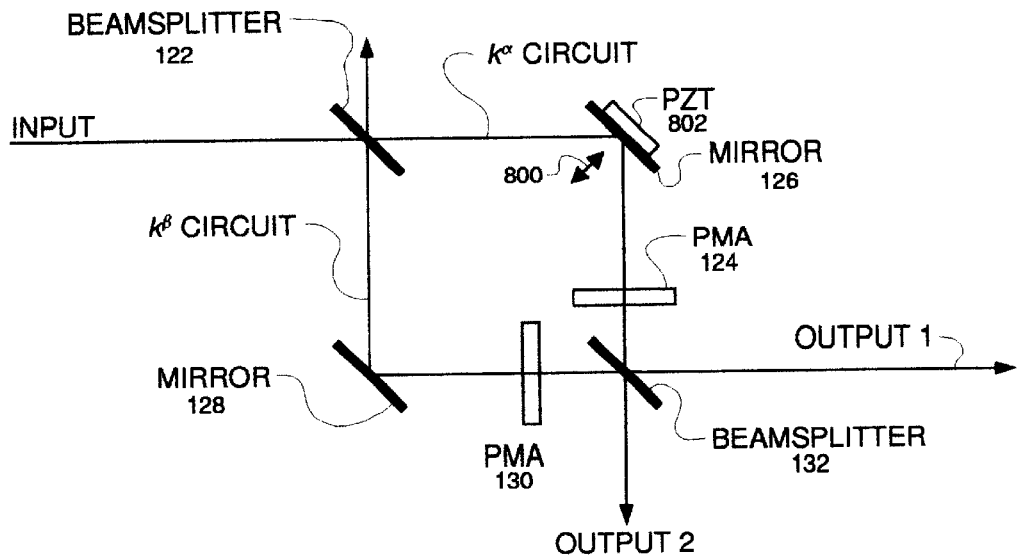
FIG. 18 depicts a transmissive configuration.

The present invention also includes a full complex spatial light modulator capable of spatially modulating both the phase and amplitude of an optical beam using two phase-only spatial light modulators. FIG. 18 depicts the full complex spatial light modulator in the transmissive configuration. In this assembly a beam of light is incident upon an amplitude beamsplitter (BMS) 122, which divides the light beam into two beams, $k^\alpha$ and $k^\beta$, of, for example, equal amplitude. In the $k^\alpha$ circuit the beam is incident upon a first PMA 124, such as depicted in FIG. 2, after being reflected from a first mirror 126. In the $k^\beta$ circuit, the beam, after being reflected by a second mirror 128 is incident upon a second PMA 130. Each pixel beam, phase adjusted by the respective PMA's 124 and 130, encounters a second beamsplitter 132 where the corresponding beams interfere. When a transform, such as a Fourier transform, is being performed the transform lense is located in the path of output beams 1 or 2 after which the transformed beam is incident on a detector. A bias beam can also be combined with the transformed beam before they reach the detector as previously discussed.

In this arrangement, the alignment of the components causes the reflected virtual image of each pixel (i, j) of the SLM on the first PMA 124 to lie on top of each corresponding pixel (i, j) of the SLM of the second PMA 130. The amplitude, D1, and phase, φ1 of the combined pixel beams, (i, j) along output 1 is therefore:

$$D1 = 2\cos\left(\frac{\alpha_{i,j} - \beta_{i,j} + \zeta}{2}\right) \qquad \text{EQ. 62}$$

$$\phi 1 = \frac{\alpha_{i,j} + \beta_{i,j} + \zeta}{2} \qquad \text{EQ. 63}$$

The amplitude, D2, and phase, φ2, of the combined pixel beams, (i, j) along output 2 is:

$$D2 = 2\cos\left(\frac{\alpha_{i,j} - \beta_{i,j} - \pi + \zeta}{2}\right) \qquad \text{EQ. 64}$$

$$\phi 2 = \alpha_{i,j} + \beta_{i,j} - \pi + \zeta/2 \qquad \text{EQ. 65}$$

where $\alpha_{i,j}$ is the phase delay caused by pixel i,j of PMA $\beta_{i,j}$ is the phase delay caused by pixel i,j of PMA π is 3.1415 . . . and ζ is the optical pathlength difference intrinsic for the $k^\alpha$ and $k^\beta$ apart from that introduced by the PMA's.

Thus, because the invention independently adjusts the $\alpha_{i,j}$'s and $\beta_{i,j}$'s, it facilitates independent control of the phase and amplitude of each combined emergent beam, i,j.

Figure 19:
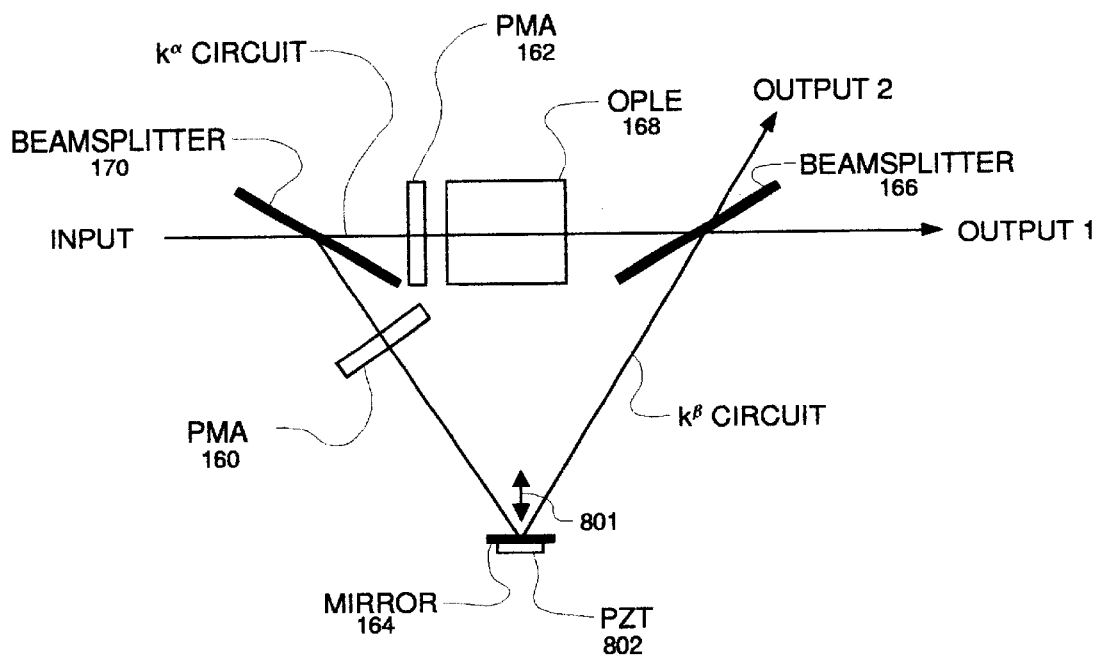
FIG. 19 depicts a reflective configuration.

Another transmissive embodiment using two PMA's 160 and 162 is depicted in FIG. 19 which uses only one mirror 164 to redirect the $k^\beta$ to the combining beamsplitter 166. An input beam is divided into two beams of near equal magnitudes by a beamsplitter 170, one traveling in the $k^\alpha$ and the other in the $k^\beta$ circuit. Like FIG. 5 this embodiment also contains an optional optical path length equalizer (OPLE) 168 for the use already explained. When a transform, such as a Fourier transform, is being performed the transform lense is located in the path of output beams 1 or 2 after which the transformed beam is incident on a detector. A bias beam can also be combined with the transformed beam before they reach the detector.

Figure 20:
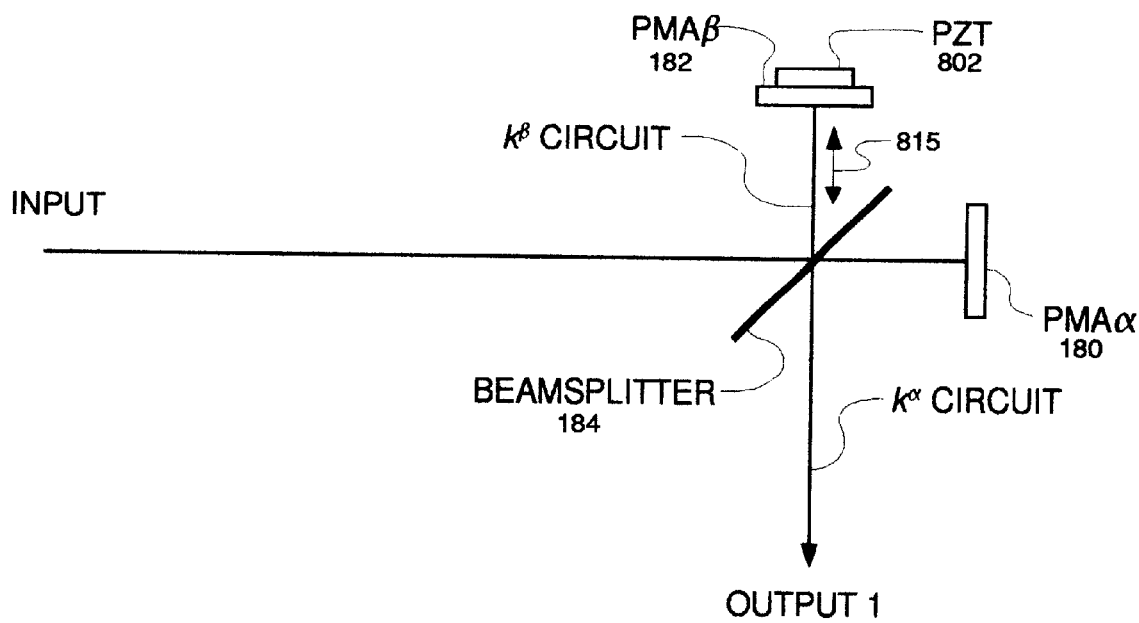
FIG. 20 depicts another reflective implementation.

A reflective SLM embodiment using two PMA's 180 and 182 is depicted in FIG. 20. In this embodiment the operations of beamsplitters 166 and 170 of FIG. 19 are combined and performed by a single beamsplitter 184. When a transform, such as a Fourier transform, is being performed the transform lense is located in the path of output beams 1 after which the transformed beam is incident on a detector. A bias beam can also be used as previously discussed which is combined with the transformed beam before they reach the detector.

Figure 21:
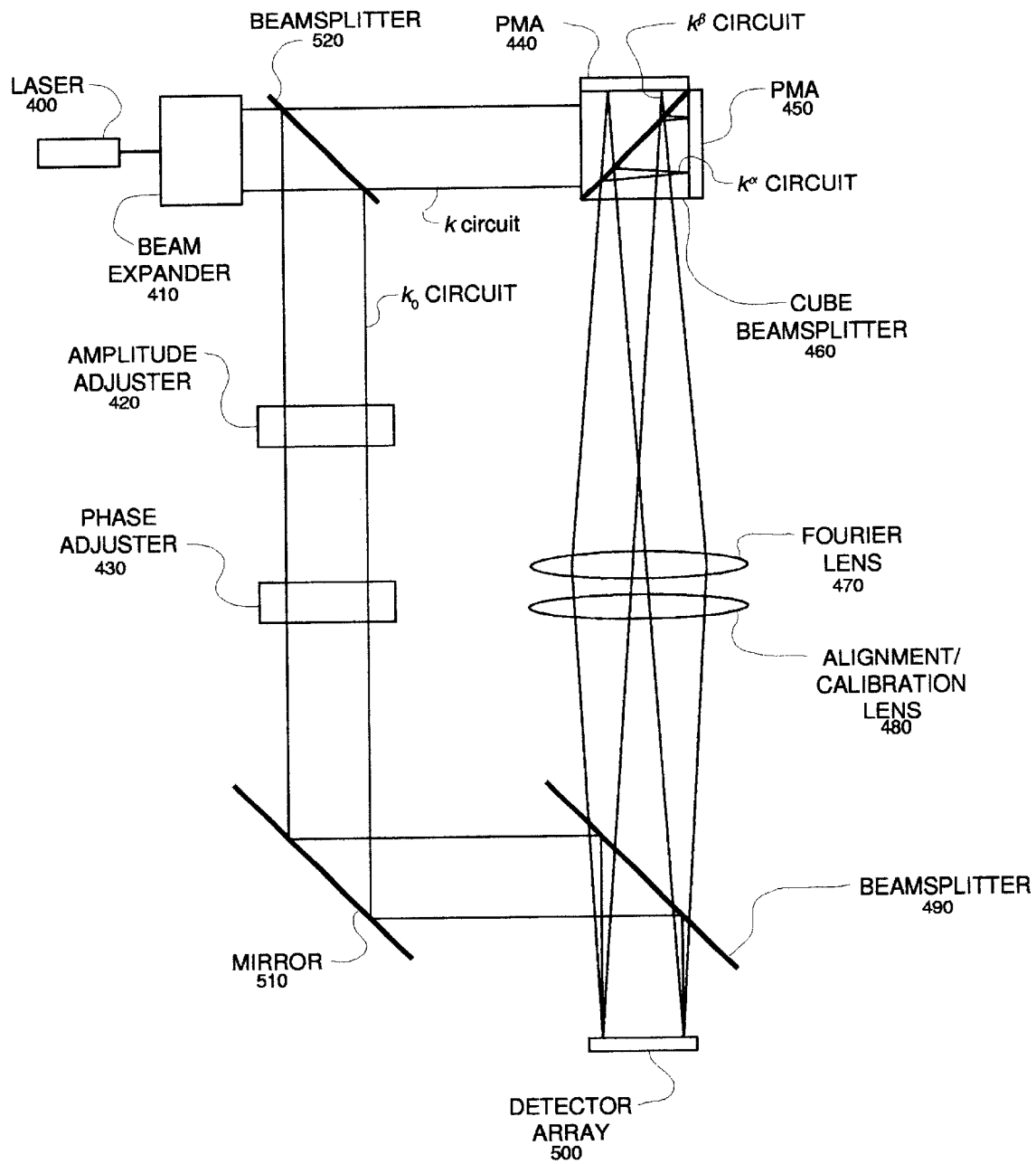
FIG. 21 shows another reflective configuration.

FIG. 21 schematically represents the reflective implementation of the optical transform generator of the invention employing the full complex SLM in the reflective configuration. Light leaving the laser 400 is expanded and collimated by beam expander 410, and directed to amplitude beamsplitter 520 which directs one portion to the $k_0$ circuit and the other to the k circuit. The $k_0$ circuit beam passes through an optional amplitude adjuster 420 and phase adjuster 430 which are independly controllable. The beam now with a set phase and amplitude, is finally, by means of mirror 510 and beamsplitter 490, brought normally incident onto detector array 500 which can be, for example, a CCD array, CID array, etc. The k circuit beam is incident upon amplitude beamsplitter 460 which may be a cube type beamsplitter or freestanding, and which divides it into two beams, $k^\alpha$ and $k^\beta$, of equal amplitude. In the $k^\alpha$ circuit (as also in the $k^\beta$ circuit) the beam is incident upon a pixel modulator assembly. Each resulting pixel beam is identified by its point of origin (i, j) on the respective PMA and is further adjusted in phase as it passes on through a like indexed (i, j) region of the SLM. Each PMA pixel is independently addressable to add a controlled variable phase delay to its corresponding emerging pixel beam.

Figure 22:
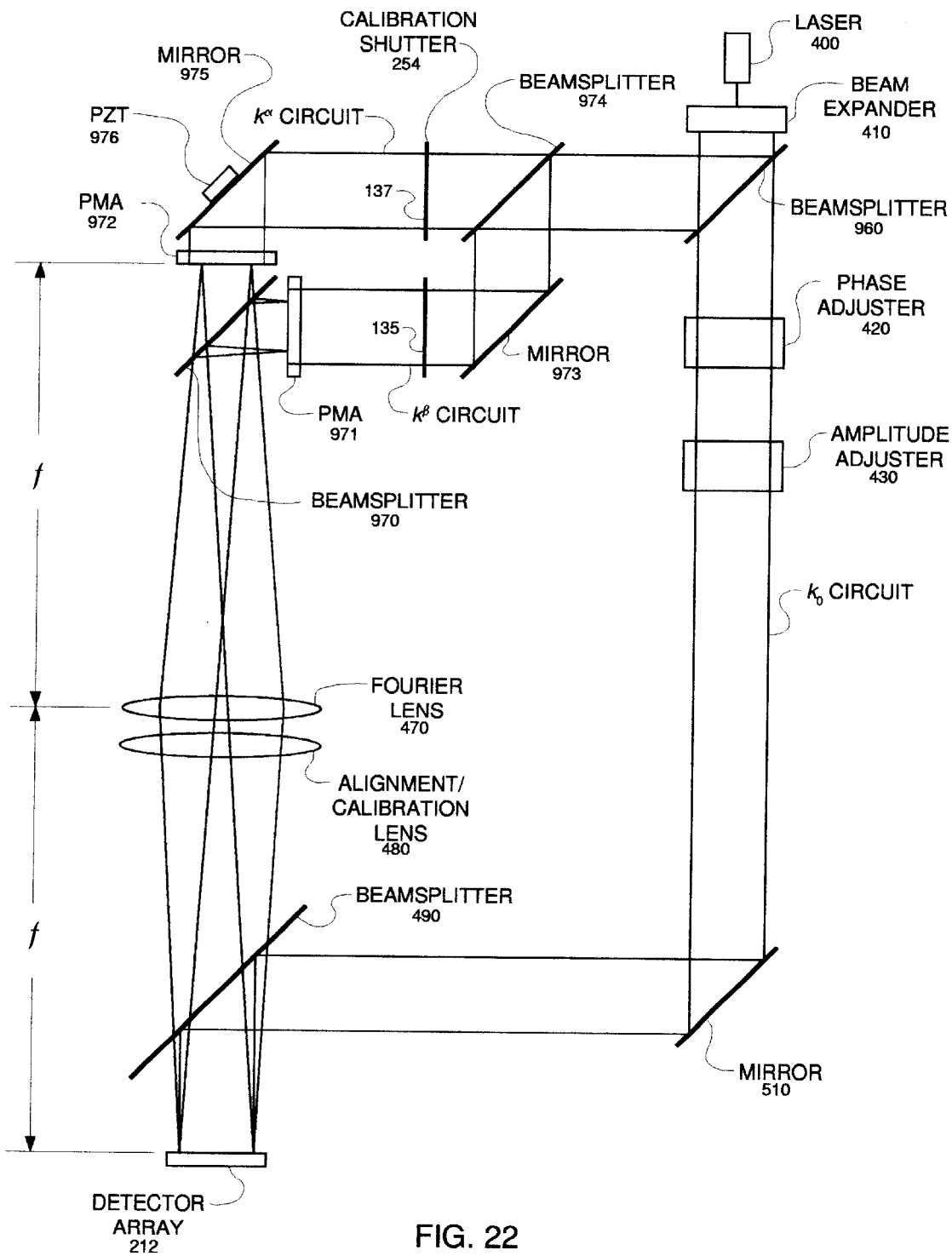
FIG. 22 depicts a transmissive configuration.

FIG. 22 schematically represents the transmissive implementation of the optical transform generator of the invention employing the full complex SLM in the reflective configuration. Light leaving the laser 400 is expanded and collimated by beam expander 410, and directed to amplitude beamsplitter 960 which directs one portion to the $k_0$ circuit and the other to the k circuit. The $k_0$ circuit beam passes through an optional amplitude adjuster 420 and phase adjuster 430 which are independly controllable. The beam now with a set phase and amplitude, is finally, by means of mirror 510 and beamsplitter 490, brought normally incident onto detector array 212 which can be, for example, a CCD array, CID array, etc. The k circuit beam is incident upon amplitude beamsplitter 974 which may be a cube type beamsplitter or freestanding, and which divides it into two beams, $k^\alpha$ and $k^\beta$, of equal amplitude. In the $k^\alpha$ circuit the beam is directed by mirror 975 to PMA 972. In the $k^\beta$ circuit mirror 973 directs the beam to PMA 971. Each resulting pixel beam is identified by its point of origin (i, j) on the respective PMA and is further adjusted in phase as it passes on through a like indexed (i, j) region of the SLM. Each PMA pixel is independently addressable to add a controlled variable phase delay to its corresponding emerging pixel beam.

To implement the foregoing, the two PMA's must be positioned so that the image reflected by the beamsplitter of one PMA is coincident pixel for pixel with the other PMA. This can be accomplished using the alignment/calibration lens 480 shown in FIGS. 21 and 22. In the preferred embodiment this lens is chosen with sufficient power and at such location so as to focus an image of each PMA onto the surface of the detector array so that each pixel of each PMA falls upon one and only one detector element. Thus each PMA pixel corresponds to one and only one detector element.

An example alignment procedure is as follows: first, turn on the $k_0$ beam and align the detector array to be near parallel to the $k_0$ wavefront, which may be ascertained by retro-reflection of the laser. Note that retro-reflection can cause laser instabilities requiring the use of optical isolators already discussed. Second, send a temporally alternating signal to two pixels at the extreme corners of one of the PMA's, for example $(i_{max}, j_{max})$ and $(-i_{max}, -j_{max})$ as shown in FIG. 2. Third, rotate the PMA about its z axis and/or slide it parallel to its surface until the alternating signals from the extreme pixels appear at only their corresponding elements of the detector array 500. Repeat this procedure for the other PMA. Note that in implementations not employing detectors arrays or a $k_0$ beam, the images of the PMA's may be viewed directly with a microscope and aligned. Following this part of the alignment the alignment lens is removed form the optical path.

The second part of the procedure involves setting the tilt of each PMA so as to be parallel to the input wavefront. Note some tilt error can be calibrated out of the system numerically using the calibration procedure described below. To perform this alignment one can view the interference fringes from the back reflection from the surfaces of the PMA's. Note that it may be necessary to block other sources of reflection such as the detector array in order to distinguish the PMA fringes. For sufficient back reflection, these fringes will be visible off beamsplitter 520 shown in FIG. 21. Alternatively, surface reflection of each PMA will produce a main spot near the center of the detector array when a Fourier lens is in place. Adjusting the tilt of the PMA's to bring these two main spots coincident at the optical axis will achieve alignment.

Additionally, the invention provides that one of the mirrors may be moved in the direction indicated by arrow 800 in FIG. 18, arrow 801 in FIG. 19, or arrow 815 in FIG. 20 in order to cause the light reflected by the area between the pixels of one PMA to arrive at the detector array with a phase so as to cancel that from the other PMA. This can be effected by the PZT 802 in the FIG. s.

Figure 23:
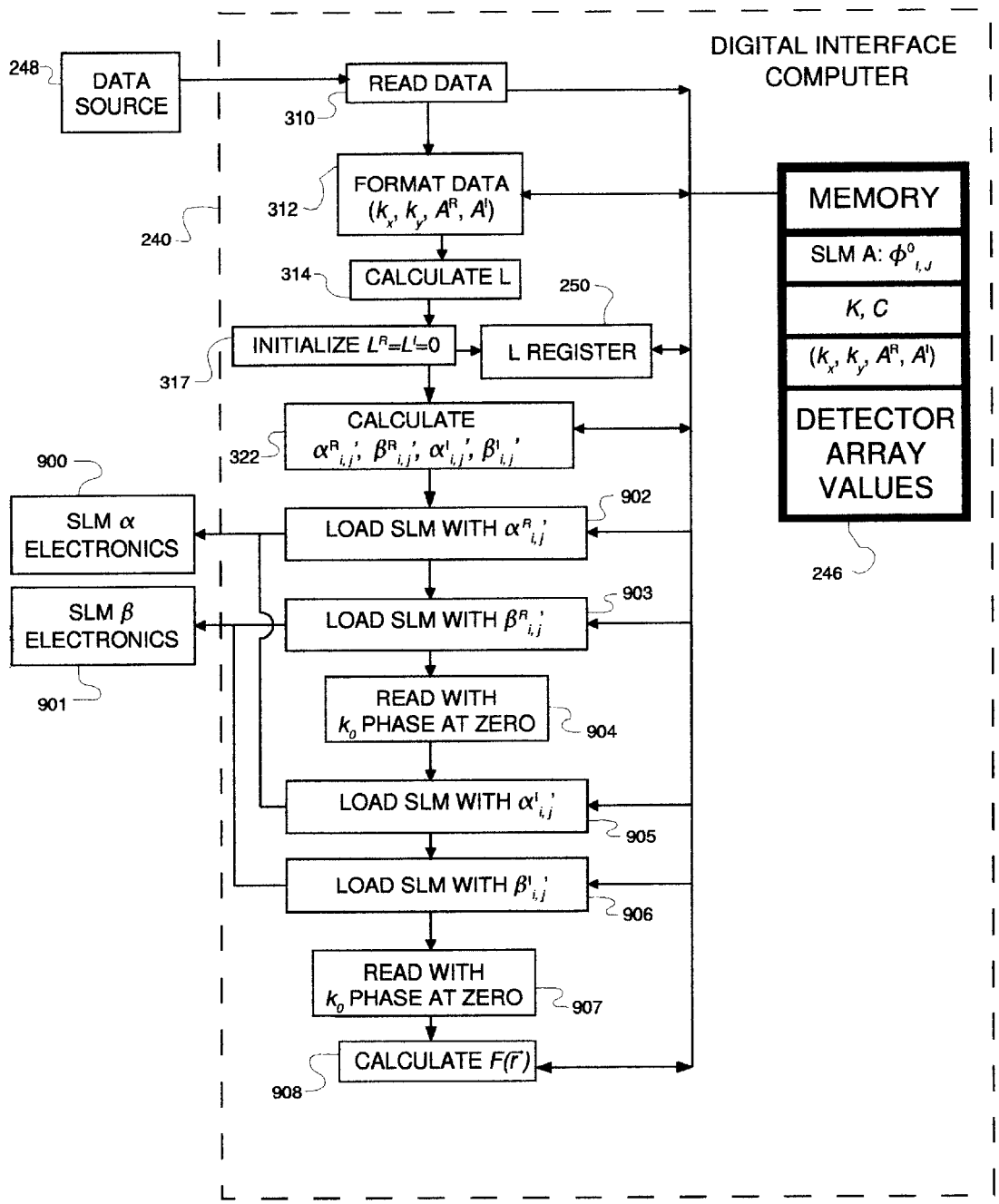
FIG. 23 depicts the first method using two SLMs.

FIG. 23 depicts the operation of the 2 SLM transform generator using an adaptation of method I. The steps: read data 310, format data 312, calculate 314, initialize 317, and calculate 322 are as described previous for FIG. 10. However, following calculate 322, the invention loads two SLMs—one with $\alpha^R_{i,j}{}'$ and the other with $\beta^R_{i,j}{}'$ as indicated by 902 and 903 respectively. Next, the read 904 is performed as described previously in FIG. 12. These results are stored in memory 246. Next, the invention loads 905 and 906 $\alpha^I_{i,j}{}'$ and $\beta^I_{i,j}{}'$ into SLMα and SLMβ and a second read 907 is performed. Finally, the function is calculated 908 from the stored detector array outputs according to:

$$F(\vec{r}) = F^R + i \times F^I \qquad \text{EQ. 66}$$

where $$F^R = \frac{\sqrt{K \times V^R(x,y)} - E_0}{C} \qquad \text{EQ. 67}$$

$$F^I = \frac{\sqrt{K \times V^I(x,y)} - E_0}{C} \qquad \text{EQ. 68}$$

$V^R$ is the voltage from each detector array pixel from the read 904

$V^I$ is the voltage from each detector array pixel from the read 907 and $E_0$, $C$, and $K$ are as discussed above with regard to method 1.

Calibration for the two SLM transform generator involves first, moving a shutter 254 in FIG. 22 into position 135 of the $k^\beta$ circuit. Then the PMA 972 for the $k^\alpha$ circuit is calibrated as discussed above with regard to FIG. 10. Next, the shutter 254 is moved into position 137 of the $k^\alpha$ circuit and the calibration of PMA 971 is performed as in FIG. 10. Finally, C and K are determined also as described above using functions with known transforms. Following the calibration the shutter 254 is removed from the optical paths.

Figure 24:
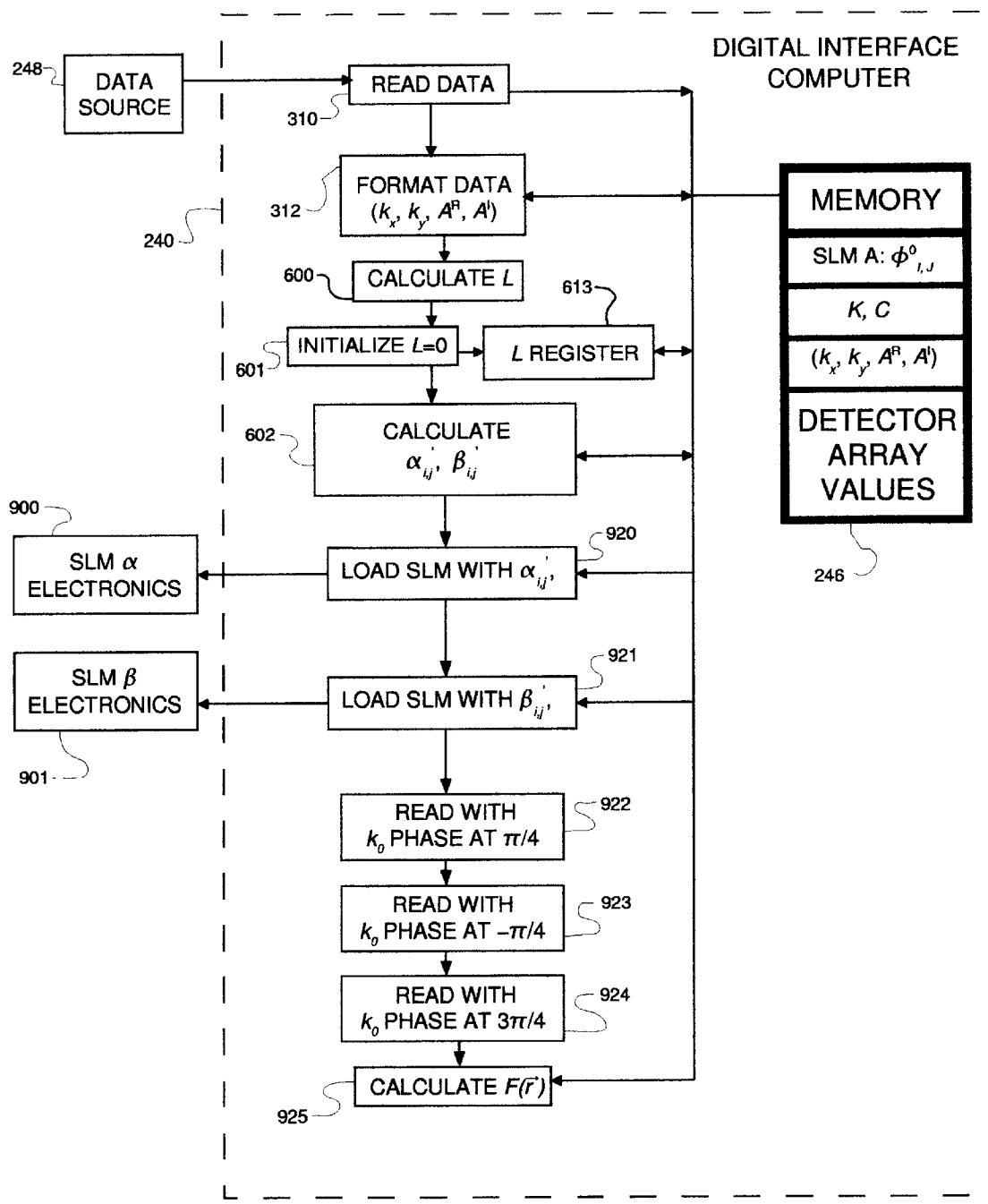
FIG. 24 depicts the second method using two SLMs.

FIG. 24 depicts the operation of the 2 SLM transform generator using an adaptation of method 2. The steps: read data 310, format data 312, calculate 600, initialize 601, and calculate 602 are as described previous for FIG. 13. However, following calculate 602, the invention loads two SLMs—one with $\alpha_{i,j}{}'$ and the other with $\beta_{i,j}{}'$ as indicated by 920 and 921 respectively. Next, the reads 922–924 are performed as described previously in FIG. 12. These results are stored in memory 246. Finally, the function is calculated 925 from the stored detector array outputs according to:

$$C \times F(\vec{r}) = u(\vec{r}) + iv(\vec{r}) \qquad \text{EQ. 69}$$

where

C is the calibration constant already discussed $u(\vec{r})$ is the real part of the function and $v(\vec{r})$ is the imaginary part of the function.

Both $u(\vec{r})$ and $v(\vec{r})$ are determined from:

$$K \times V(\vec{r}) = [u(\vec{r})]^2 + [v(\vec{r})]^2 + E_0^2 + 2u(\vec{r}) \times E_0 \cos\phi - 2v(\vec{r}) \times E_0 \sin\phi \qquad \text{EQ. 70}$$

where

K is a scaling constant as in equations 23 and 24.

$V(\vec{r})$ is the voltage (output) from the detector array $\phi$ is the phase of the $k_0$ beam at t=0 as indicated for the reads 922–924 of FIG. 24, and $E_0$ is the magnitude of the $k_0$ beam (positive by definition).

For $\phi$ equal to $\pi/4$ equation 70 produces:

$$K \times V_{\pi/4}(\vec{r}) = [u(\vec{r})]^2 + [v(\vec{r})]^2 + E_0^2 + \sqrt{2}E_0 u(\vec{r}) - \sqrt{2}E_0 v(\vec{r}) \qquad \text{EQ. 71}$$

For $\phi$ equal to $-\pi/4$ equation 70 produces:

$$K \times V_{-\pi/4}(\vec{r}) = [u(\vec{r})]^2 + [v(\vec{r})]^2 + E_0^2 + \sqrt{2}E_0 u(\vec{r}) + \sqrt{2}E_0 v(\vec{r}) \qquad \text{EQ. 72}$$

Subtracting equation 71 from equation 72 produces the imaginary part: of C×F:

$$\text{Im}[C \times F(\vec{r})] = v(\vec{r}) = \frac{K}{2E_0\sqrt{2}}\left[V_{-\frac{\pi}{4}}(\vec{r}) - V_{\frac{\pi}{4}}(\vec{r})\right] \qquad \text{EQ. 73}$$

For $\phi$ equal to $3\pi/4$ equation 70 produces:

$$K \times V_{3\pi/4}(\vec{r}) = [u(\vec{r})]^2 + [v(\vec{r})]^2 + E_0^2 - \sqrt{2}E_0 u(\vec{r}) - \sqrt{2}E_0 v(\vec{r}) \qquad \text{EQ. 74}$$

Subtracting equation 74 from equation 71 produces the real part of C×F:

$$\text{Re}[C \times F(\vec{r})] = u(\vec{r}) = \frac{K}{2E_0\sqrt{2}}\left[V_{\frac{\pi}{4}}(\vec{r}) - V_{\frac{3\pi}{4}}(\vec{r})\right] \qquad \text{EQ. 75}$$

Dividing by the calibration constant produces $F(\vec{r})$.

The method of extending the dynamic range using the $k_0$ beam can be applied to the 2 SLM system. FIG. 15 depicts such an implementation which like FIG. 4 includes an extra detector array the operation of which has been discussed.

Alternatively, the invention may employ many additional detector arrays as shown in FIG. 16 which is adapted from FIG. 4. In FIG. 16, mirror 58, detector 30, and beamsplitter 60 have been moved; and mirror 943, beamsplitters 945, 951, 957, 959, 970 and 977, and detectors 939 and 941 have been inserted into the optical train along with optional amplitude modulators 949 and 953. It should be clear that there are many such arrangements all of which follow from the foregoing and basic optical design techniques.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   a two dimensional transform generator producing a transform beam, comprising:
      first and second phase only spatial light modulators modulating first and second light beams; and
      a combiner combining the modulated first and second light beams producing the transform beam modulated in both desired phase and amplitude; and
   a bias beam generator producing a bias beam combined with the transform beam to produce a combined beam.

2. An apparatus as recited in claim 1, further comprising a detector detecting the combined beam.

3. An apparatus as recited in claim 1, wherein said transform generator further comprises a transform lense.

4. An apparatus, comprising:
   a two dimensional transform generator producing a transform beam;
   a bias beam generator producing a bias beam combined with a transform beam to produce a combined beam; and
   a detector detecting the combined beam, wherein said detector includes pixels and said bias beam generator adjusts the bias beam to zero out a pixel during calibration.

5. An apparatus, comprising:
   first and second phase only spatial light modulators modulating first and second light beams; and
   a combiner combining the modulated first and second light beams producing a combined beam modulated in both desired phase and amplitude.

6. An apparatus as recited in claim 5, further comprising a transform lense transforming the combined beam.

7. An apparatus as recited in claim 5, further comprising a bias beam generator producing a bias beam combined with the combined beam.

8. An apparatus, comprising:
   first and second phase only spatial light modulators modulating first and second light beams;
   a combiner combining the modulated first and second light beams producing a combined beam modulated in both desired phase and amplitude; and
   a transform lense transforming the combined beam.

9. An apparatus as recited in claim 8, wherein said lense comprises a Fourier transform lense.

10. An apparatus as recited in claim 8, further comprising a detector detecting the transformed combined beam.

11. An apparatus, comprising:
    a source producing a coherent beam;
    a beamsplitter splitting the beam into first and second beams; and
    a two dimensional spatial phase modulator comprising first and second phase only spatial light modulators modulating the first and second beams and said beam splitter combining the modulated first beam and the second beam producing a combined beam modulated in both desired phase and amplitude.

12. An apparatus, comprising:
    a source producing a coherent beam;
    a beamsplitter splitting the beam into first and second beams, the second beam comprising a bias beam;
    a two dimensional spatial phase modulator modulating the first beam and said beam splitter combining the modulated first beam and the second beam; and
    a transform lense positioned to transform the modulated first beam before the modulated first beam is combined with the second beam.

13. An apparatus as recited in claim 12, wherein said modulator comprises a pixel modulator producing phase modulated pixel beams and further comprising:
    a pixel detector detecting the pixels beams; and
    a computer coupled to said pixel modulator and said pixel detector, loading the pixel modulator with phase modulation values, storing values of the pixel beams and producing a transform output.

14. An apparatus, comprising:
    a source producing a coherent beam;
    a first beam splitter splitting the beam into first and second beams;
    a first two dimensional phase only spatial phase modulator modulating the first beam;
    a second two dimensional phase only spatial phase modulator modulating the second beam; and
    a second beam splitter combining the modulated first and second beams producing a combined beam modulated in both desired phase and amplitude.

15. An apparatus comprising:
    a source producing a coherent beam;
    a first beam splitter splitting the beam into first and second beams;
    a first two dimensional spatial phase modulator modulating the first beam;
    a second two dimensional spatial phase modulator modulating the second beam;
    a second beam splitter combining the modulated first and second beams;
    a transform lense transforming the combined modulated first and second beams and producing a transform beam;
    a bias beam generator producing a bias beam;
    a third beam splitter combining the bias beam and the transform beam; and
    a detector detecting the combined bias and transform beams.

16. An apparatus as recited in claim 15, further comprising a computer coupled to said modulator and said detector, loading the modulator with phase modulation values, storing values of pixel beams and producing a transform output.

17. An apparatus, comprising:
    a laser beam source producing a laser beam;
    a beam expander expanding the laser beam;
    a first beamsplitter splitting the laser beam into a bias beam and a transform path beam;
    a phase adjuster adjusting a phase of the bias beam;
    an amplitude adjuster adjusting an amplitude of the phase adjusted bias beam producing an amplitude adjusted bias beam;
    a first mirror reflecting the amplitude adjusted as an adjusted bias beam;
    a second beam splitter splitting the transform path beam into first and second beams;
    a second mirror reflecting the second beam;
    a calibration shutter positioned to block the first beam and/or the second reflected beam;

a position adjustable mirror reflecting the first beam;

a first two dimensional, transmissive, spatial, phase only pixel modulator modulating the reflected first beam producing first phase modulated pixel beams;

a second two dimensional, transmissive, spatial, substantially phase only pixel modulator modulating the reflected second beam producing second phase modulated pixel beams;

a third beamsplitter combining the first and second phase modulated pixel beams producing combined pixel beams;

a Fourier transform lense transforming the combined pixel beams producing transformed beam wavefronts;

an alignment lense aligning beam wavefronts;

a fourth beam splitter combining the beam wavefronts with the adjusted bias beam producing a biased beam wavefronts;

a pixel detector detecting the biased beam wave fronts; and a computer loading said modulators with phase adjustment values, reading pixel values of said detector and producing a Fourier transform.

18. A method of performing a transform, comprising:

loading a two dimensional transform generator with first real phase related values;

setting a phase of a bias beam at zero phase;

reading first real outputs of a detector;

loading a two dimensional transform generator with second real phase related values;

reading second real outputs of a detector;

loading the generator with first imaginary phase related values;

reading first imaginary outputs of the detector;

loading the generator with second imaginary phase related values;

reading second imaginary outputs of the detector; and adding the first real outputs, the second real outputs, the first imaginary outputs and the second imaginary outputs forming the transform.

19. A method of performing a transform, comprising:

loading a first two dimensional transform generator with first real phase related values;

loading a second two dimensional transform generator with second real phase related values;

setting a phase of a bias beam at zero phase;

reading real outputs of a detector;

loading the first two dimensional transform generator with first imaginary phase related values;

loading the second two dimensional transform generator with second imaginary phase related values;

setting a phase of a bias beam at zero phase;

reading imaginary outputs of the detector; and adding the real outputs and imaginary outputs forming the transform.

20. An apparatus for creating a wavefront having an arbitrarily defined phase and amplitude distribution, comprising:

a source of a coherent laser beam;

first and second substantially phase-only spatial light modulators;

a beam splitter splitting the laser beam into two essentially equal power beams, said beam splitter and said first and second spatial light modulators being positioned such that each of the two essentially equal power beams is incident on a face of one of the first and second spatial light modulators and a virtual image of each of the first and second spatial light modulators coincide pixel by pixel; and a controller controlling a phase of each of the first and second spatial light modulators so that light emitted from said beam splitter has a desired phase and amplitude.

21. The apparatus as claimed in claim 20, further comprising a Fourier transform lens positioned to produce a Fourier transform of the light emitted from the beam splitter on an output plane.

22. An apparatus for performing an optical two-dimensional Fourier transform, comprising:

a source of a coherent laser beam;

first and second substantially phase-only spatial light modulators;

a beam splitter splitting the laser beam into first and second beams, the first beam being a bias beam;

a phase adjuster adjusting a phase of the bias beam;

an amplitude adjuster adjusting an amplitude of the phase adjusted bias beam;

a Fourier transform lens producing a Fourier transform of light emitted from said beam splitter; and reflecting elements directing the bias beam onto an output plane which is co-linear with an axis of the Fourier transform produced by the Fourier transform lens.

23. The apparatus as claimed in claim 22, further comprising:

a photodetector array located on the output plane and producing a signal;

means for reading and storing the signal produced from said photodetector array; and control means for adjusting the phase and amplitude of the bias beam and for causing the signal produced at the photodetector array to be the real or imaginary part of the Fourier transform.

24. An apparatus, comprising:

a two dimensional transform generator producing a transform beam, comprising:

first and second phase only spatial light modulators modulating first and second light beams; and a combiner combining the modulated first and second light beams producing a combined beam modulated in both desired phase and amplitude; and a bias beam generator producing a bias beam combined with a transform beam to produce a combined beam, wherein a Fourier transform function is calculated.

25. An apparatus, comprising:

first and second phase only spatial light modulators modulating first and second light beams; and a combiner combining the modulated first and second light beams producing a combined beam modulated in both desired phase and amplitude, wherein a Fourier transform function is calculated.

26. An apparatus, comprising:

first and second phase only spatial light modulators modulating first and second light beams;

a combiner combining the modulated first and second light beams producing a combined beam modulated in both desired phase and amplitude; and a transform lense transforming the combined beam, wherein a Fourier transform function is calculated.

27. An apparatus, comprising:
a source producing a coherent beam;
a beamsplitter splitting the beam into first and second beams; and
a two dimensional spatial phase modulator modulating the first beam, comprising:
first and second phase only spatial light modulators modulating first and second light beams and said beam splitter combining the modulated first beam and the second beam producing a combined beam modulated in both desired phase and amplitude, wherein a Fourier transform function is calculated.

28. An apparatus, comprising:
a source producing a coherent beam;
a first beam splitter splitting the beam into first and second beams;
a first two dimensional phase only spatial phase modulator modulating the first beam;
a second two dimensional phase only spatial phase modulator modulating the second beam; and
a second beam splitter combining the modulated first and second beams producing a combined beam modulated in both desired phase and amplitude, wherein a Fourier transform function is calculated.

29. A method of performing a transform, comprising:
loading a two dimensional transform generator with first real phase related values;
setting a phase of a bias beam at zero phase;
reading first real outputs of a detector;
loading a two dimensional transform generator with second real phase related values;
reading second real outputs of a detector;
loading the generator with first imaginary phase related values;
reading first imaginary outputs of the detector;
loading the generator with second imaginary phase related values;
reading second imaginary outputs of the detector; and
adding the first real outputs, the second real outputs, the first imaginary outputs and the second imaginary outputs forming the transform, wherein a Fourier transform function is calculated.

* * * * *